US012668494B2

(12) United States Patent
Lin et al.

(10) Patent No.: US 12,668,494 B2
(45) Date of Patent: Jun. 30, 2026

(54) SPHERICAL, LOW SURFACE AREA PRECIPITATED SILICAS AS MATTING AGENTS IN POWDER COATINGS

(71) Applicant: Evonik Operations GmbH, Essen (DE)

(72) Inventors: Bob Tse-Weng Lin, Branchburg, NJ (US); Maria Nargiello, Piscataway, NJ (US); Bernhard Resch, Allentown, PA (US); Karl W. Gallis, Perryville, MD (US); William J. Hagar, Perryville, MD (US)

(73) Assignee: Evonik Operations GmbH, Essen (DE)

( * ) Notice: Subject to any disclaimer, the term of this patent is extended or adjusted under 35 U.S.C. 154(b) by 472 days.

(21) Appl. No.: 18/247,340

(22) PCT Filed: Sep. 21, 2021

(86) PCT No.: PCT/EP2021/075842
§ 371 (c)(1),
(2) Date: Mar. 30, 2023

(87) PCT Pub. No.: WO2022/069286
PCT Pub. Date: Apr. 7, 2022

(65) Prior Publication Data
US 2025/0270098 A1 Aug. 28, 2025

Related U.S. Application Data

(60) Provisional application No. 63/086,684, filed on Oct. 2, 2020.

(51) Int. Cl.
*C01B 33/193* (2006.01)
*C09D 7/42* (2018.01)
*C09D 7/61* (2018.01)

(52) U.S. Cl.
CPC .............. *C01B 33/193* (2013.01); *C09D 7/42* (2018.01); *C09D 7/61* (2018.01); *C01P 2004/32* (2013.01); *C01P 2006/12* (2013.01); *C01P 2006/19* (2013.01)

(58) Field of Classification Search
CPC .......... C01B 33/193; C09D 7/42; C09D 7/61; C01P 2004/32; C01P 2006/12; C01P 2006/19
See application file for complete search history.

(56) References Cited

U.S. PATENT DOCUMENTS

| | | |
|---|---|---|
| 5,206,332 A | 4/1993 | Hammer et al. |
| 6,193,795 B1 | 2/2001 | Nargiello et al. |
| 6,737,467 B1 | 5/2004 | Decker et al. |
| 6,946,119 B2 | 9/2005 | Gallis et al. |
| 7,255,852 B2 | 8/2007 | Gallis et al. |
| 7,438,895 B2 | 10/2008 | Gallis |
| 8,034,173 B2 | 10/2011 | Dietz et al. |
| 8,609,068 B2 | 12/2013 | Hagar et al. |
| 8,945,517 B2 | 2/2015 | Hagar et al. |
| 9,028,605 B2 | 5/2015 | Hagar et al. |
| 9,186,307 B2 | 11/2015 | Gallis et al. |
| 9,327,988 B2 | 5/2016 | Hagar et al. |
| 9,469,768 B1 | 10/2016 | James |
| 9,617,162 B2 | 4/2017 | Hagar et al. |
| 10,287,438 B2 | 5/2019 | Nassivera et al. |
| 10,328,002 B2 | 6/2019 | Dolan et al. |
| 10,959,922 B2 | 3/2021 | Nassivera et al. |
| 11,285,088 B2 | 3/2022 | Hagar et al. |
| 11,548,788 B2 | 1/2023 | Cornelius et al. |
| 2002/0137872 A1 | 9/2002 | Schneider et al. |
| 2004/0161389 A1 | 8/2004 | Gallis et al. |
| 2004/0161390 A1 | 8/2004 | Gallis et al. |
| 2006/0110542 A1 | 5/2006 | Dietz et al. |
| 2007/0048206 A1 | 3/2007 | Hung et al. |
| 2008/0160052 A1 | 7/2008 | Gallis |
| 2008/0160053 A1 | 7/2008 | McGill et al. |
| 2011/0206746 A1 | 8/2011 | Hagar et al. |
| 2012/0216719 A1 | 8/2012 | Hagar et al. |
| 2014/0072634 A1 | 3/2014 | Hagar et al. |
| 2014/0140938 A1 | 5/2014 | Gallis et al. |
| 2015/0086463 A1 | 3/2015 | Hagar et al. |
| 2016/0038387 A1 | 2/2016 | Gallis et al. |
| 2016/0214865 A1 | 7/2016 | Hagar et al. |
| 2016/0326373 A1* | 11/2016 | Nassivera ............ C09C 1/3063 |
| 2017/0087066 A1 | 3/2017 | Nassivera et al. |
| 2018/0168958 A1 | 6/2018 | Dolan et al. |
| 2020/0109056 A1 | 4/2020 | Gallis et al. |

(Continued)

FOREIGN PATENT DOCUMENTS

| | | |
|---|---|---|
| CN | 104119765 | 10/2014 |
| CN | 107083099 | 8/2017 |

(Continued)

OTHER PUBLICATIONS

International Search report issued Jan. 10, 2022, in PCT/EP2021/075842, 4 pages.
Written Opinion issued Jan. 10, 2022, in PCT/EP2021/075842, 6 pages.
U.S. Pat. No. 6,946,119, Sep. 20, 2005, 2004/0161389, Gallis et al.
U.S. Pat. No. 7,255,852, Aug. 14, 2007, 2004/0161390, Gallis etal.
U.S. Pat. No. 8,034,173, Oct. 11, 2011, 2006/0110542, Dietz et al.
U.S. Pat. No. 11/646,125, Dec. 27, 2006, 2008/0160053, McGill etal.
U.S. Pat. No. 7,438,895, Oct. 21, 2008, 2008/0160052, Karl Gallis.
U.S. Pat. No. 8,609,068, Dec. 17, 2013, 2011/0206746, Hagar et al.
U.S. Pat. No. 8,945,517, Feb. 3, 2015, 2014/0072634, Hagar et al.
U.S. Pat. No. 9,327,988, May 3, 2016, 2015/0086463, Hagar et al.

(Continued)

*Primary Examiner* — Daniel C. Mccracken
(74) *Attorney, Agent, or Firm* — Grüneberg Global IP. PLLC

(57) ABSTRACT

Spherical, low surface area precipitated silicas are useful as matting agents in powder coatings. Corresponding matte powder coating compositions and methods of preparing matte powder coatings containing the silicas are provided.

21 Claims, 13 Drawing Sheets

(56)                References Cited

U.S. PATENT DOCUMENTS

| | | | |
|---|---|---|---|
| 2020/0206107 A1 | 7/2020 | Hagar et al. |
| 2021/0024359 A1 | 1/2021 | Cornelius et al. |
| 2021/0269359 A1 | 9/2021 | Geisler et al. |
| 2021/0309529 A1 | 10/2021 | Gallis et al. |
| 2023/0002627 A1 | 1/2023 | Lazar et al. |

FOREIGN PATENT DOCUMENTS

| | | | |
|---|---|---|---|
| CN | 111278774 | 6/2020 | |
| GB | 1 508 992 | 4/1978 | |
| JP | 7-166091 A | 6/1995 | |
| JP | H08-209029 * | 8/1996 | ............... C01D 5/00 |
| JP | 9-208215 A | 8/1997 | |
| JP | 11- 512124 A | 10/1999 | |
| JP | 2009-102548 A | 5/2009 | |
| WO | 2008/124788 | 10/2008 | |
| WO | 2014/152736 | 9/2014 | |
| WO | 2019/042975 | 3/2019 | |

OTHER PUBLICATIONS

U.S. Pat. No. 9,617,162, Apr. 11, 2017, 2016/0214865, Hagar et al.
U.S. Appl. No. 61/446,782, filed Feb. 25, 2011, Hagar et al.
U.S. Pat. No. 9,028,605, May 12, 2015, 2012/0216719, Hagar et al.
U.S. Pat. No. 9,186,307, Nov. 17, 2015, 2014/0140938, Gallis et al.
U.S. Appl. No. 14/920,951, filed Oct. 23, 2015, 2016/0038387, Gallis et al.
U.S. Appl. No. 62/158,577, filed May 8, 2015, Nassivera et al.
U.S. Pat. No. 10,287,438, May 14, 2019, 2016/0326373, Nassivera et al.
U.S. Appl. No. 62/233,513, filed Sep. 28, 2015, Nassivera et al.
U.S. Pat. No. 10,959,922, Mar. 30, 2021, 2017/0087066, Nassivera et al.
U.S. Appl. No. 62/435,921, filed Dec. 19, 2016, Gallis et al.
U.S. Appl. No. 16/470,467, filed Jun. 17, 2019, 2020/0109056, Gallis et al.
U.S. Pat. No. 10,328,002, Jun. 25, 2019, 2018/0168958, Dolan et al.
U.S. Appl. No. 62/699,187, filed Jul. 17, 2018, Geisler al.
U.S. Appl. No. 17/260,227, filed Jan. 14, 2021, 2021/0269359, Geisler al.
U.S. Appl. No. 62/725,487, filed Aug. 31, 2018, Briand et al.
U.S. Appl. No. 17/251,334, filed Dec. 11, 2020, 2021/0309529, Gallis et al.
U.S. Appl. No. 62/550,725, filed Aug. 28, 2017, Cornelius et al.
U.S. Pat. No. 11,548,788, Jan. 10, 2023, 2021/0024359, Cornelius et al.
U.S. Appl. No. 62/551,259, filed Aug. 29, 2017, Hagar et al.
U.S. Pat. No. 11,285,088, Mar. 29,2022, 2020/0206107, Hagar et al.
U.S. Appl. No. 17/792,400, filed Jul. 13, 2022, 2023/0002627, Lazar et al.
U.S. Appl. No. 63/346,627, filed May 27, 2022, Gallis et al.
U.S. Appl. No. 63/291,590, filed Dec. 20, 2021, Gallis et al.
U.S. Appl. No. 63/423,557, filed Nov. 8, 2022, Sinclair et al.
Office Action issued in Japanese Patent Application No. 2023-518190 on Nov. 20, 2025 (with English translation), 7 pages.

* cited by examiner

SPHERICAL, LOW SURFACE AREA PRECIPITATED SILICAS AS MATTING AGENTS IN POWDER COATINGS

CROSS-REFERENCE TO RELATED APPLICATIONS

This application is the National Stage entry under § 371 of International Application No. PCT/EP2021/075842, filed on Sep. 21, 2021, and which claims the benefit of priority to U.S. Provisional Application No. 63/086,684, filed on Oct. 2, 2020. The content of each of these applications is hereby incorporated by reference in its entirety.

BACKGROUND OF THE INVENTION

Field of the Invention

The present invention relates to spherical, low surface area precipitated silicas as matting agents in powder coatings, matte powder coating compositions and methods of preparing matte powder coatings comprising the same.

Description of Related Art

Powder coatings are 100% solid coating formulations comprising solid binder and pigment and applied as a dry powder. The solid binder is first compounded with pigments, fillers and additives in an extruder, where the binder is first melted and pigments and fillers are homogeneously mixed with molten resin/binder. The molten mass is subsequently chilled down and chipped into flakes. Flakes are milled into powder coating of defined particles sizes and distributions. The dry powder is electrostatically sprayed onto panels and once again melted one final time under heat curing. The solid binder melts and/or cross-links upon heating/curing and binds the pigment upon cooling.

Powder coatings differ from liquid coatings such as traditional paint and high solid or all solid liquid coatings in that powder coatings do not have a liquid carrier and therefore, does not emit volatile organic compounds (VOC) into the environment. Powder coatings also do not spread onto surfaces like traditional liquid coatings. As a powder, they must be applied through electrostatic spray guns having either corona or tribo charge and the powder is melted under heat to spread and coalesce onto a surface.

The use of silicas in liquid coatings is well known in the art as it provides a range of functionalities including rheology control, flow control, reinforcement, burnish and scratch resistance, suspension of pigments and fillers, and gloss reduction in liquid systems. The use of silicas in powder coatings are also known for rheology control, as carrier for leveling agents, anticaking agent, and to impart mar and scratch resistance. While silicas have been used for gloss reduction in liquid systems, such use in powder coatings have been less successful because traditional silicas create too much decrease in melt flow from the higher loadings needed to reduce gloss.

Powder coatings have long encountered difficulties in achieving a consistent and uniform matte/low gloss finish. This difficulty is observed across all thermoset resin chemistries and their corresponding crosslinkers. As applications for powder coatings continue to broaden across a greater variety of substrates for both indoor and exterior use, the need to achieve consistent and varying gloss levels becomes more challenging. Adding to the drivers for consistent matte finish are the trend towards lower temperature cure to accommodate heat sensitive substrates and the desire for a greater range of aesthetic appearance combined with maintaining coating performance requirements.

In liquid coatings where film shrinkage occurs during cure, matting effects can be easily accomplished by the addition of matting agents to create the micro-roughed surfaces and gloss levels are readily controlled across all gloss ranges from high to ultra low. In powder coatings, however, since the systems are 100% solids, there is no film shrinkage from the evaporation of water, solvents or volatile components, only very slight volume shrinkage during cure. As a result, current methods of creating a matte finish in powder coatings include (1) the use of waxes; (2) controlling resin cure rates to create incompatibility; and (3) use of functional fillers. The use of waxes such as polyolefin, polypropylene or PTFE, however, can be inconsistent due to different cure temperatures or heat up rate. They also pose problems such as slip, poor re-coatability and/or poor adhesion to substrate. Regarding controlling resin cure rates to create incompatibility, varying chemical reactivity of cure is often inconsistent due to poor distribution of reactive components or problems with storage stability issues. Perhaps the most consistent of these methods are the use of functional fillers such as calcium carbonate ($CaCO_3$), barium sulfate ($BaSO_4$, barite), Nepheline-syenite or aluminum trihydrate (Al(OH) 3, ATH). The varying particle sizes of these fillers along with their broad particle size distributions (PSD), however, offer limited matting efficiencies. To achieve lower matte finish in powder coatings, the higher dosage level needed can result in poor surface appearance, physical properties, application and adhesion problems.

The use of fumed silicas, sub-micron sized precipitated silicas, low loading level of precipitated siicas and other spheroidal particles in powder coating compositions are known. For example, U.S. Pat. No. 6,737,467 (Decker et al.) discloses powder coatings with a low gloss appearance comprising spheroidal particles having a mean particle size greater than 10 microns and preferably greater than 15 microns, and having a maximum particle size of about 50 microns. Spheroidal particles include glass microspheres, ceramic microspheres, naturally-occurring or synthetic spheroidal minerals such as cristobalite, polymer microspheres and metal microspheres.

WO 2008/124788 (Ramsey et al.) discloses monomer matte additives used in actinic radiation curable 100% solids coating compositions to produce a coating with a matte finish upon curing. The monomer matte additives are formed by dispersing from about 10 wt-% to about 40 wt-% of amorphous silica into a monomer. Although Ramsey et al. discloses all solids and substantially all solids compositions, Ramsey does not teach its monomer matte additive in powder coating compositions. Even if powder coating is contemplated, which it does not, the silica of Ramsey et al. is less than about 1 micron, less than about 800 nanometer, less than about 700 nanometer, less than about 600 nanometer, less than about 500 nanometer, less than about 400 nanometer, less than about 300 nanometer, less than about 200 nanometer, or less than about 100 nanometer. Also, examples 1 and 2 of Ramsey et al. only demonstrated the use of 20:80 and 30:70 Nan-O-Sil colloidal silica:acrylate monomer as monomer matte additives even though Ramsey et al. generally discloses precipitated amorphous silica. Even though the loading level of the monomer matte additive present in the coating composition of Ramsey et al. is between about 25 and 65% by weight, example 3 of Ramsey et al. provides a coating composition comprising only 26.229% of the isobornyl acrylate matte additive of example 1. As such, the Nan-O-Sil colloidal silica content in the coating composition exemplified is about 5-8%.

U.S. Pat. No. 9,469,768 (James, Joseph H.) discloses low gloss, chemical resistant powder coating compositions comprising a urethane-polyester powder coating resin, a sterene-free hydroxyl functional acrylic resin, and a hardener or curative agent, wherein such composition provides low gloss without the use of matte agents or fillers such as barium and calcium sulfates. Although precipitated silicas are included in its compositions, only 1-3 wt. % is used and silicas are not used for gloss reduction.

U.S. Pat. Appl. 2002/0137872 (Schneider et al.) discloses coating compositions comprising a film-forming resin in which is dispersed a plurality of particles, which particles can be organic or inorganic particles, or mixtures thereof and such particles typically have an average particle size ranging from 0.1 to 15 microns. Organic particles include diamond particles and particles formed from carbide materials such as titanium, silicon and boron carbide. Inorganic particles include silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; baddeleyite; and eudialyte. Schneider et al. teaches that the compositions of its invention are able to achieve 20 to nearly 100 percent gloss retention or less than 10 percent gloss reduction. Therefore, Schneider et al. teaches away from powder coatings with matting effect.

U.S. Pat. No. 5,206,332 discloses curing agents for the production of low gloss powder coatings based on epoxy resins, which curing agents consists of a mixture of 2-imidazoline derivative with a melting point >60° C. and cyanuric acid as well as, if desired, anticaking agents and/or stabilizers. Anticaking agents such as precipitated or pyrogenic silica in an amount of 0.2 to 5% by weight in relation to the weight of the curing agent are recommended to improve flow properties. Schneider does not teach the use of precipitated silicas for gloss reduction.

Chinese Patent Application CN 107083099A (Wang Hongxing) discloses powder coating with anti-caking agent comprising 20-40 parts precipitated silica, 5-15 parts fumed silica, 10-30 parts by weight of polyamide waxes, 10-30 parts of ethylene bis-stearamide. Preferably, precipitated silicas of Wang have an average particle diameter of 4.5-5.5 μm and an oil absorption 280 ml/100 g. Wang does not teach the use of precipitated silicas for matting effect in powder coatings.

U.S. Pat. Appl. No. 2007/0048206 (Hung et al.) discloses coating compositions including powder coating compositions comprising ultrafine silica particles present in an amount of 3 to 50 percent by volume based on the total volume of the coating composition. Ultrafine silica particles refers to silica particles having a B.E.T. specific surface area of at least 10 square meters per gram and in particular embodiment, the ultrafine silica particles have a spherical diameter of no more than 200 nm. The ultrafine silica particles of Hung et al. exhibit rheology properties similar to fumed silicas. Hung et al. provides that its compositions provide favorable thixotropy property, viscosity and sag resistance and corrosion resistance, but does not disclose matting effect provided by its invention.

CN 104119765 discloses powder coating compositions comprising, amongst others, 10-13% of precipitated silicas. Additional PERGOPACK® M2 matting powder and oxidized polyethylene wax are also required, however, for such composition.

There remains a need in the industry for powder coating compositions which provide matting efficiencies without negatively affecting melt flow and surface appearance such as orange peel.

SUMMARY OF THE INVENTION

The present invention provides an unmet need in the industry by providing formulators with spherical precipitated silicas with low B.E.T. surface areas and low oil absorption as matting agents for powder coatings. Without intending to be bound by any particular theory, it is believed that the low surface area and the corresponding low oil absorption of the precipitated silicas of the present invention ensures that at the high loading levels needed for matting 100% solid systems, the silica particles do not adversely increase the melt-flow rheology upon curing, a negative effect often encountered in prior art attempts at controlling gloss in 100% solid powder coating systems. These properties also allow for minimum resin demand to disperse and wet these particles, allowing for good resin coverage at high particle volume concentration. This feature can prevent a detrimental impact on corrosion resistance normally associated with high inert filler loading. The uniformity and narrow particle size distribution of these precipitated silica particles also allows for effective and consistent matting across all chemistries and cure conditions, including low temperature cure systems. In addition to the sphericity, these particles have almost ultra-low porosity versus traditional precipitated silica. This solid structure allows for ease of incorporation and drives a robust particle integrity when extruded with other ingredients for powder coating. These spherical particles also enhance the hardness of the final coating while maintaining its flexibility and even improving its physical properties by reinforcement when tested for rapid or slow deformation (impact resistance, Mandrel bend, Erichsen cupping). Therefore, in the first aspect, the present invention provides the following:

1.1 a matte powder coating composition comprising (a) one or more resin; and (b) spherical precipitated silicas having a B.E.T. surface area in the range of 1 to 50 $m^2/g$, an oil absorption of less than 60 g/100 g and a median particle size (d50) in the range of 1 to 20 μm;

1.2 the composition of formula 1.1, wherein the spherical precipitated silicas are present in an amount from 1 to 40 wt. %, in one embodiment, 2 to 40 wt. %, in another embodiment, 2 to 30 wt. %, in still another embodiment, 2 to 20 wt. %, in yet another embodiment, 5 to 40 wt. %, in still another embodiment, 5 to 30 wt. %, in still another embodiment, 5 to 20 wt. %, based on the total weight of the composition;

1.3 the composition of formula 1.1 or 1.2, wherein the spherical precipitated silicas have a B.E.T. surface area in the range of 1 to 50 $m^2/g$, in one embodiment, 1 to 20 $m^2/g$, in another embodiment, 5 to 15 $m^2/g$;

1.4 the composition of any of formulae 1.1-1.3, wherein the spherical precipitated silicas have an oil absorption of less than 60 g/100 g, in one embodiment, less than 50 g/100 g, in another embodiment, less than 40 g/100 g, in still another embodiment, in the range of 30 to 40 g/100 g silicas;

1.5 the composition of any of formulae 1.1-1.4, wherein the spherical precipitated silicas have a median particle size (d50) in the range of 1 to 20 μm, in one embodiment, 1 to 10 μm, in another embodiment, 1 to 5 μm, in yet another embodiment, 5 to 20 µm, in still another embodiment, 5 to 15 µm, in still another embodiment, 10 to 20 µm;

1.6 the composition of any of formulae 1.1-1.5, wherein the spherical precipitated silicas have a d90 in the range of 1 to 30 µm, in another embodiment, 5 to 30 µm, in another embodiment, 10 to 30 µm, in still another embodiment, 10 to 25 µm;

1.7 the composition of any of formulae 1.1-1.6, wherein the spherical precipitated silicas have a d10 in the range of 1 to 5 µm, in another embodiment, 2 to 4 µm;

1.8 the composition of any of formulae 1.1-1.7, wherein the spherical precipitated silicas have a (d90-d10)/d50 ratio in the range of 1.0 to 2, in a further embodiment, 1.1 to 1.5;

1.9 the composition of any of formulae 1.1-1.8, wherein the spherical precipitated silicas have a sphericity $S_{80}$ factor of >0.85, in another embodiment, >0.9;

1.10 the composition of any of formulae 1.1-1.9, wherein the resin is a thermosetting resin and said composition further comprising one or more curing agents;

1.11 the composition of any of formulae 1.1-1.10, wherein the resin is an epoxy, polyester or acrylic, silicone, FEVE fluoropolymer resin or mixtures thereof (e.g., hybrid polyester-epoxy resin), in a particular embodiment, the resin is a saturated and unsaturated polyesters, acrylics, acrylates, polyester-urethanes, acrylic-urethanes, epoxy, epoxy-polyester, polyester-acrylics and epoxy-acrylics, in another particular embodiment, hydroxy or carboxy functional polyester resin, in a further embodiment, the resin is a carboxy functional polyester resin (e.g., Crylcoat 4659-0 resin from Allnex);

1.12. the composition of formula 1.10 or 1.11, wherein the one or more curing agent is an amine, acid, anhydride or blocked isocyanate curing agent (e.g., aliphatic or aromatic polymer blocked isocyanates, uredione isocyanates, glycourils (Powderlink 1174)) or epoxy terminated, hydroxyl terminated, oxirane (i.e., ethylene oxide) terminated or hydroxyalkylamide curing agent, in a particular embodiment, the one or more curing agent is a hydroxyalkylamide or triglycidylisocyanurate (TGIC) curing agent;

1.13. the composition of any of formulae 1.1-1.9, wherein the resin is a thermoplastic resin;

1.14. the composition of formula 1.13, wherein the resin is selected from the group consisting of polyethylene, polyethylene terephthalate, polypropylene, polybutylene terephthalate, polyamide, polyvinyl chloride, and polyvinylidene fluoride and nylon;

1.15. the composition of any of formulae 1.1-1.9, wherein the resin is a UV curable resin (e.g., unsaturated polyacrylates, mixtures of unsaturated polyesters and acrylates, methacrylated polyesters, vinyl ether urethane or (meth)acrylated prepolymers, acrylated hyper branched polyesters and specially formulated solid epoxy resins, a blend of an unsaturated polyester and a vinyl ether urethane component), and the composition further comprises a photoinitiator (e.g., solid alpha-hydroxy-acetophenones and bis-acylphosphine oxide derivatives);

1.16. the composition of any of 1-1.15, further comprising one or more pigment, fillers, extenders, flow additives or flow aids, catalysts, degassing agents, as well as other matting agents, gloss modifiers or waxes;

1.17. the composition of any of 1-1.16, further comprising one or more waxes, in a particular embodiment, the one or more waxes are selected from the group consisting of polyolefin wax (e.g., 15 µm such as POWERADD™ 9025 FROM Lubrizol), unmicronized polyolefin wax (e.g., Lanco™ 1550 from Lubrizol), micronized synthetic polyamid wax (e.g., 7 µm such as Deuteron Wax A) and modified PE wax such as Huntsman DT 3329-1.

In the second aspect, the present invention provides:

2.1 a matting agent for powder coatings comprising spherical precipitated silicas having a B.E.T. surface area in the range of 1 to 50 m²/g, an oil absorption of less than 60 g/100 g and a median particle size (d50) in the range of 1 to 20 µm, based on the total weight of the composition;

2.2 the matting agent of formula 2.1, wherein the spherical precipitated silicas are present in an amount from 1 to 40 wt. %, in one embodiment, 2 to 40 wt. %, in another embodiment, 2 to 30 wt. %, in still another embodiment, 2 to 20 wt. %, in yet another embodiment, 5 to 40 wt. %, in still another embodiment, 5 to 30 wt. %, in still another embodiment, 5 to 20 wt. %, based on the total weight of the composition;

2.3 the matting agent of formula 2.1 or 2.2, wherein the spherical precipitated silicas have a B.E.T. surface area in the range of 1 to 50 m²/g, in one embodiment, 1 to 20 m²/g, in another embodiment, 5 to 15 m²/g;

2.4 the matting agent of any of formulae 2.1-2.3, wherein the spherical precipitated silicas have an oil absorption of less than 60 g/100 g, in one embodiment, less than 50 g/100 g, in another embodiment, less than 40 g/100 g, in still another embodiment, 30 to 40 g/100 g of silicas;

1.12 the matting agent of any of formulae 2.1-2.4, wherein the spherical precipitated silicas have a median particle size (d50) in the range of 1 to 20 µm, in one embodiment, 1 to 10 µm, in another embodiment, 1 to 5 µm, in yet another embodiment, 5 to 20 µm, in still another embodiment, 5 to 15 µm, in still another embodiment, 10 to 20 µm;

2.5 the matting agent of any of formulae 2.1-2.5, wherein the spherical precipitated silicas have a d90 in the range of 1 to 30 µm, in another embodiment, 5 to 30 µm, in another embodiment, 10 to 30 µm, in still another embodiment, 10 to 25 µm;

2.6 the matting agent of any of formulae 2.1-2.6, wherein the spherical precipitated silicas have a d10 in the range of 1 to 5 µm, in another embodiment, 2 to 4 µm;

2.7 the matting agent of formulae 2.1-2.7, wherein the spherical precipitated silicas have a (d90-d10)/d50 ratio in the range of 1.1 to 2, in a further embodiment, 1.1 to 1.5;

2.8 the matting agent of any of formulae 2.1-2.8, wherein the spherical precipitated silicas have a sphericity $S_{80}$ factor of >0.85, in another embodiment, >0.9.

In the third aspect, the present invention provides:

3.1 a method for reducing gloss (i.e., providing a matte finish upon curing) in a powder coating composition, which process comprises adding an effective amount of the matting agent according of any of formulae 2.1-2.8 to a powder coating composition.

3.2 the method of formula 3.1, wherein the matting agent is present in an amount from 1 to 40 wt. %, in one embodiment, 2 to 40 wt. %, in another embodiment, 2 to 30 wt. %, in still another embodiment, 2 to 20 wt. %, in yet another embodiment, 5 to 40 wt. %, in still another embodiment, 5 to 30 wt. %, in still another embodiment, 5 to 20 wt. %, in yet another embodiment, 10 to 20 wt. %, based on the total weight of the composition;

3.3 the method of formula 3.1 or 3.2, wherein the powder coating composition comprises one or more thermosetting resin and said composition further comprising one or more curing agents;

3.4 the method of formula 3.3, wherein the resin is an epoxy, polyester or acrylic, silicone, FEVE fluoropolymer resin or mixtures thereof (e.g., hybrid polyester-epoxy resin), in a particular embodiment, the resin is a saturated and unsaturated polyesters, acrylics, acrylates, polyester-urethanes, acrylic-urethanes, epoxy, epoxy-polyester, polyester-acrylics and epoxy-acrylics, in another particular embodiment, hydroxy or carboxy functional polyester resin, in a further embodiment, the resin is a carboxy functional polyester resin (e.g., Crylcoat 4659-0 resin from Allnex);

3.5 the method of formula 3.3 or 3.4, wherein the one or more curing agent is an amine, acid, anhydride or blocked isocyanate curing agent (e.g., aliphatic or aromatic polymer blocked isocyanates, uredione isocyanates, glycourils (Powderlink 1174)) or epoxy terminated, hydroxyl terminated, oxirane (i.e., ethylene oxide) terminated or hydroxyalkylamide curing agent, in a particular embodiment, the one or more curing agent is a hydroxyalkylamide or triglycidylisocyanurate (TGIC) curing agent;

3.6 the method of formula 3.1 or 3.2, wherein the powder coating composition comprises one or more thermoplastic resin;

3.7 the method of formula 3.6, wherein the resin is selected from the group consisting of polyethylene, polyethylene terephthalate, polypropylene, polybutylene terephthalate, polyamide, polyvinyl chloride, and polyvinylidene fluoride and nylon;

3.8 the method of formula 3.1 or 3.2, wherein the powder coating composition comprises one or more UV curable resin (e.g., unsaturated polyacrylates, mixtures of unsaturated polyesters and acrylates, methacrylated polyesters, vinyl ether urethane or (meth)acrylated prepolymers, acrylated hyper branched polyesters and specially formulated solid epoxy resins, a blend of an unsaturated polyester and a vinyl ether urethane component), and the composition further comprises a photoinitiator (e.g., solid alpha-hydroxy-acetophenones and bis-acylphosphine oxide derivatives);

3.9 the method of any of formulae 3.1-3.8, wherein the powder coating composition further comprises adding one or more pigment, fillers, extenders, flow additives or flow aids, catalysts, degassing agents, as well as other matting agents, gloss modifiers or waxes;

3.10 the method of any of formulae 3.1-3.9, further comprises adding one or more waxes, in a particular embodiment, the one or more waxes are selected from the group consisting of polyolefin wax (e.g., 15 μm such as POWERADD™ 9025 FROM Lubrizol), unmicronized polyolefin wax (e.g., Lanco™ 1550 from Lubrizol), micronized synthetic polyamid wax (e.g., 7 μm such as Deuteron Wax A) and modified PE wax such as Huntsman DT 3329-1.

DETAILED DESCRIPTION OF THE INVENTION

Figures 1, 2:
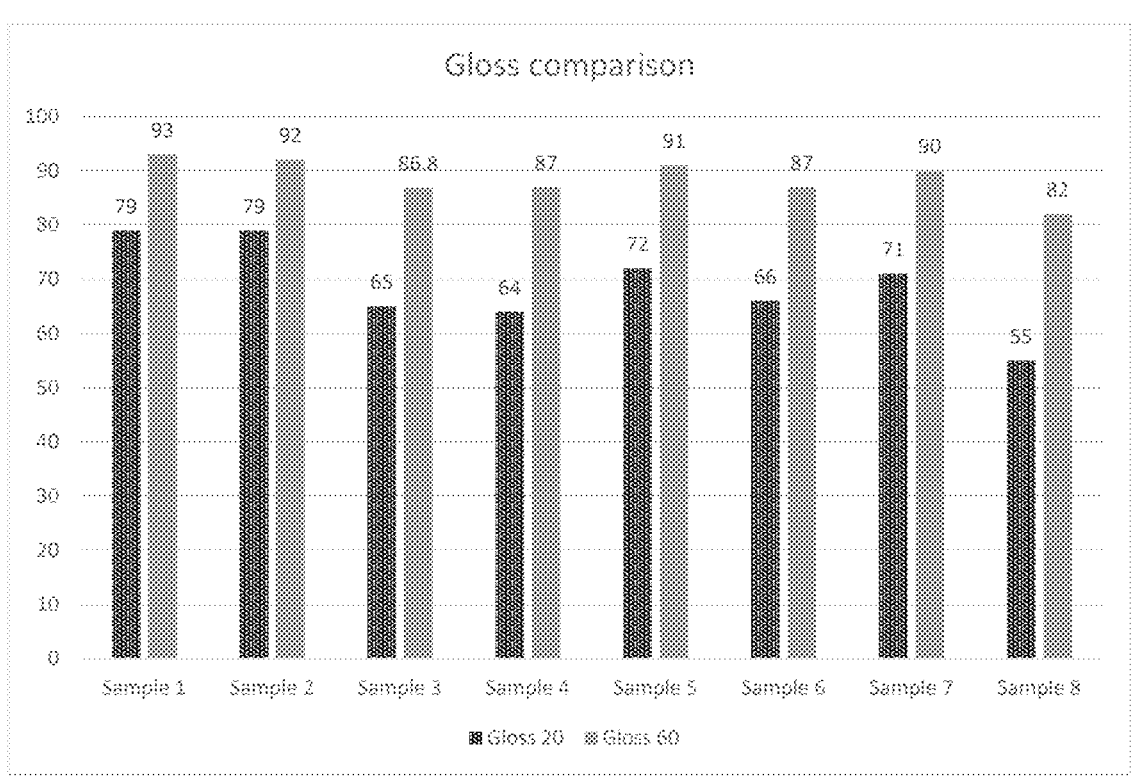
FIG. 1 shows a continuous loop reactor for preparing the silicas as matting agents for powder coatings of the invention.
FIG. 2 shows matting results of the powder coating compositions of Examples 1-8 at 20° and 60°.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "a composition comprising A or B" may refer to a composition including A where B is not present, a composition including B where A is not present, or a composition where both A and B are present. The phrases "at least one of A, B, . . . and N" or "at least one of A, B, . . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The present invention is directed to spherical precipitated silicas with low B.E.T. surface areas and low oil absorption as matting agents for powder coatings. Spherical precipitated silicas suitable for the invention generally have a B.E.T. surface area that fall within the range of 1 to 50 $m^2/g$, in one embodiment, 1 to 20 $m^2/g$, in another embodiment, 5 to 15 $m^2/g$. B.E.T. surface areas of silicas can be determined using any method known in the art, e.g., using a Micromeritics TriStar 3020 instrument by the BET nitrogen adsorption method of Brunaur et al., J. Am. Chem. Soc., 60, 309 (1938).

The spherical precipitated silicas suitable for the invention also have an oil absorption of less than 60 g/100 g, in one embodiment, less than 50 g/100 g, in another embodiment, less than 40 g/100 g, in still another embodiment, 30 to 40 g/100 g silicas. Oil absorption values can be determined using any method known in the art, such as the rub-out method described in American Society for Testing and Materials ASTM D281 using linseed oil (cc oil absorbed per 100 g of the silica particles).

The median particle size (d50) of the spherical precipitated silicas useful for the current invention generally fall in the range of 1 to 20 μm, in one embodiment, 1 to 10 μm, in another embodiment, 1 to 5 μm, in yet another embodiment, 5 to 20 μm, in still another embodiment, 5 to 15 μm. The spherical precipitated silicas useful for the invention also have a d90 that falls within the range of 1 to 30 μm, in another embodiment, 5 to 30 μm, in another embodiment, 10 to 30 μm, in still another embodiment, 10 to 25 μm. In another embodiment, the spherical precipitated silicas useful for the invention have a d10 that falls within the range of 1 to 5 μm, in another embodiment, 2 to 4 μm. Median particle size (d50) as well as d90, and d10 may be determined any methods known in the art, including but not limited to using the laser diffraction method using a Horiba LA 300 instrument. Dry particles are submitted to the instrument for analysis, and samples are de-agglomerated using the instrument's internal ultrasonic vibration at setting 4 for 2 minutes. Precipitated silica particle size can then be measured using a HORIBA Laser Scattering Dry Particle Size Distribution Analyzer LA-950 through the angle of scattered laser light.

As discussed herein, the narrow particle size distribution of the spherical precipitated silicas described herein is especially helpful in providing efficient matting across all chemistries and cure conditions such as low temperature cure systems. Therefore, spherical precipitated silicas having a (d90-d10)/d50 ratio that falls within the range of 1.1 to 2 is particularly suitable for the compositions and methods of the invention.

Spherical precipitated silicas of the invention are particularly suitable as matting agents in powder coatings. As use herein, the term "spherical precipitated silica" means precipitated silicas that are rounded to well rounded in shape. "Rounded" particles are those having gently rounded corners with flat faces and small reentrants nearly absent. "Well rounded" particles are those having a uniform convex grain outline with no flat faces, corners, or reentrants discernable. In one embodiment, at least 80% of the silica particles of the invention are rounded to well rounded. In another embodiment, the sphericity of the spherical precipitated silicas of the invention may be characterized by a sphericity $S_{80}$ factor of >0.85, in another embodiment, >0.9. In one embodiment, "$S_{80}$" is calculated as follows. An SEM image magnified 20,000 times, which is representative of the silica particle sample, is imported into photo imaging software, and the outline of each particle (two-dimensionally) is traced. Particles that are close in proximity to one another but not attached to one another should be considered separate particles for the evaluation. The outlined particles are then filled in with color, and the image is imported into particle characterization software (e.g., IMAGE-PRO PLUS available from Media Cybernetics, Inc., Bethesda, Md.) capable of determining the perimeter and area of the particles. Sphericity of the particles can then be calculated according to the following equation:

$$Circularity = (4\pi \times area)/(perimeter^2),$$

wherein perimeter is the software measured perimeter derived from the outlined trace of the particles, and wherein area is the software measured area within the traced perimeter of the particles. The above calculation is carried out for each particle that fits entirely within the SEM image. These values are then sorted by value, and the lowest 20% of these values are discarded. The remaining 80% of these values are averaged to obtain $S_{80}$. Additional information on sphericity can be found in U.S. Pat. Nos. 8,945,517, 8,609,068 and U.S. Pat. Publication No. 2020/0206107, the contents of each of which are incorporated herein by reference in their entirety.

In another embodiment, the spherical precipitated silicas of the invention may be measured by any particle analysis instrument for measuring size and shapes of particles such as the FlowCam 8000, from Yokogawa Fluid Imaging Technologies Inc. In particular, the Flowcam 8000 analyzer is operated by passing a slurry of the silica particles past a high-resolution camera that rapidly captures images of each particle. The software then characterizes the images of the particles for shape-circularity, or aspect ratio, etc. The images can be evaluated for circularity, sorted by value and the lowest 20% of the circularity values are omitted. The average of the remaining 80% are averaged and reported as the Sao sphericity.

Examples of the spherical precipitated silicas having the B.E.T. surface area, oil absorption and median particle size disclosed herein and the methods of making such silicas are described in U.S. Pat. Nos. 8,945,517, 8,609,068 and U.S. Pub. No. 2020/0206107, the contents of each of which are incorporated by reference in their entirety.

The term "powder coatings" or "powder coating composition" refers to all solid coating compositions in powder (i.e., non-liquid) form.

In another aspect, the invention provides matte powder coating compositions and methods of reducing gloss in powder coating compositions comprising the use of the spherical precipitated silicas described herein as matting agents. The loading level of the spherical precipitated silicas described herein may be present at 1 wt. % to 40 wt. %, in one embodiment, 2 to 40 wt. %, in another embodiment, 2 to 30 wt. %, in still another embodiment, 2 to 20 wt. %, in yet another embodiment, 5 to 40 wt. %, in still another embodiment, 5 to 30 wt. %, in still another embodiment, 5 to 20 wt. %, based on the total weight of the composition.

Traditional prior art attempts in controlling gloss in 100% solid powder coating systems often encounter the loss of melt-flow rheology and the creation of the undesirable "orange peel" effects on the coated substrate. It is believed that the unique characteristics of the spherical precipitated silicas described herein allows for the higher loading level that is usually needed for matting 100% solid systems without such negative melt-flow rheology and orange peel effects.

The matte powder coating compositions disclosed herein contain one or more thermosetting, thermoplastic or UV curable resins commonly used in powder coatings and are well known in the art. Wherein the powder coating composition of the invention is a thermosetting powder coating compositions, such compositions may include one or more thermosetting resin known in the art and one or more curing agents.

Thermosetting resins include but are not limited to those based on epoxy, polyester, acrylic, silicone, FEVE fluoropolymer resin or mixtures thereof (e.g., hybrid polyester-epoxy resin), for example, saturated and unsaturated polyesters, acrylics, acrylates, polyester-urethanes, acrylic-urethanes, epoxy, epoxy-polyester, polyester-acrylics and epoxy-acrylics. In another embodiment, the resin is a polyamide, polyesteramid, polycarbonates, polyurea resins and mixtures thereof. In still another embodiment, the resin is a hydroxy or carboxy functional polyester resin, in a further embodiment, the resin is a carboxy functional polyester resin such as Crylcoat® 4659-0 from Allnex.

Curing agent for thermosetting powder coating compositions are also known in the art and include an amine, acid, anhydride or blocked isocyanate curing agents. In a particular embodiment, the one or more curing agents is an aliphatic or aromatic polymer blocked isocyanates, uredione isocyanates, glycourils (Powderlink 1174)), vinyl urethanes, vinyl function urethane resins or any mixtures thereof, or expoxy terminated, hydroxyl terminated, oxirane (i.e., ethylene oxide) terminated or hydroxyalkylamide resins. In a particular embodiment, the one or more curing agents is a hydroxyalkylamide curing agent such as Primid® XL 552 hydroxyalkylamide crosslinker available from EMS-Griltech or triglycidylisocyanurate (TGIC) curing agent.

Wherein the matte powder coating compositions disclosed herein is a thermoplastic powder coating composition, thermoplastic resins known in the art are contemplated, including those selected from the group consisting of polyethylene, polyethylene terephthalate, polypropylene, polybutylene terephthalate, polyamide, polyvinyl chloride, and polyvinylidene fluoride and nylon.

Wherein the matte powder coating compositions disclosed herein is a UV-curable powder coating composition, such composition further comprises a photoinitiator. The UV curable resins and photo-initiator known in the art is contemplated for the current invention. Examples of UV curable resins suitable for UV curable powder coating compositions include unsaturated polyacrylates, mixtures of unsaturated polyesters and acrylates, methacrylated polyesters, vinyl ether urethane or (meth)acrylated prepolymers, acrylated hyper branched polyesters and specially formulated solid epoxy resins, a blend of an unsaturated polyester and a vinyl ether urethane component.

Selection of photoinitiators suitable for the UV-curable powder coating compositions of the invention are within the skill of the artisan. Photoinitiator which is capable of absorbing UV light and initiates the polymerization of the binder system is suitable. Typically, solid alpha-hydroxy-acetophenones and bis-acylphosphine oxide derivatives or combinations thereof are suitable. Additional information on UV-curable powder coatings are disclosed in "UV-Curable Powder Coatings; Optimization of Coating Performance", PCI Magazine, Vol. 4, No. 2, Fall 2002, the contents of which are incorporated by reference in their entirety.

The powder coating composition of the invention may optionally contain other additives including but not limited to pigment, fillers, extenders, flow additives or flow aids, catalysts, degassing agents, as well as other matting agents, gloss modifiers or waxes. Compounds having anti-microbial activity may also be added as is taught in U.S. Pat. No. 6,093,407, the entire disclosure of which is incorporated herein by reference.

The powder coating compositions of the invention may be prepared by conventional methods known to one skilled in the art. For example, the resins and matting agents of the invention as well as other optional additives may be blended together and mixed. The powder coating composition blend is then extruded, wherein it is homogenized and dispersed in a state past its melting temperature through the extrusion shear forces. The extruded mixture is then rolled flat and cooled, broken into small pieces and then milled and/or sieved to make fine powder. Alternatively, the coating composition may be prepared according to conventional methods known in the art and the matting agent of the invention may be added to the finished powder coating composition fine powder prior to heating or curing.

The matting agents of the invention as described herein, when used in powder coating compositions provide powder coatings with a matte finish upon curing. Therefore, the invention contemplates a matte powder coating composition and methods of reducing gloss in powder coating compositions. The term "matte powder coating compositions" refer to powder coating compositions which provides a matte finish upon curing. Matte powder coating compositions of the invention may provide powder coatings with moderate matt/gloss (e.g., 30-75, in one embodiment 40-60, in another embodiment 30-60 gloss units at) 60°, and in a particular embodiment, with minimal orange peel without the need for additional matting agent or gloss modifier or functional fillers such as calcium carbonate ($CaCO_3$), barium sulfate ($BaSO_4$, barite), Nepheline-syenite or aluminum trihydrate ($Al(OH)_3$, ATH). Wherein lower gloss or higher matting is desired (e.g., <40 or <30, in some embodiment, <20, in another embodiment, <10 gloss units at) 60°, traditional techniques for providing matt finish for powder coatings my be incorporated into the current invention, including the use of functional fillers such as calcium carbonate ($CaCO_3$), barium sulfate ($BaSO_4$, barite), Nepheline-syenite or aluminum trihydrate ($Al(OH)_3$, ATH) or other matting agents or gloss modifiers in the powder coating compositions of the invention or methods of reducing gloss disclosed herein. Therefore, the invention contemplates powder coating compositions and methods of reducing gloss in powder coating compositions wherein said compositions and methods provide moderate gloss or low gloss (e.g., <75, in some embodiment, <40, in another embodiment, <30, in still another embodiment, <20, in yet another embodiment, <10 gloss units at) 60° by adjusting the amount of the spherical precipitated silica matting agents of the invention optionally in combination with other functional fillers such as calcium carbonate ($CaCO_3$), barium sulfate ($BaSO_4$, barite), Nepheline-syenite or aluminum trihydrate ($Al(OH)_3$, ATH) and/or other matting agents or gloss modifiers or controlling resin cure rates to create incompatibility. In a particular embodiment, the compositions and methods of the invention contemplate incorporating one or more waxes selected form the group consisting of polyolefin wax (e.g., 15 μm such as POWERADD™ 9025 FROM Lubrizol), unmicronized polyolefin wax (e.g., Lanco™ 1550 from Lubrizol), micronized synthetic polyamid wax (e.g., 7 μm such as Deuteron Wax A) and modified PE wax such as Huntsman DT 3329-1.

Powder coating compositions of the invention may be applied onto a substrate by electrostatic spray, thermal or flame spray, fluidized bed coating methods known in the art. The substrate may be metallic, non-metallic and may be pre-treated by cleaning, conditioning (e.g., to obtain certain pH level), coating (e.g., with zinc phosphate or zirconium), sealing (e.g., with chrome or non-chrome sealers or dry-in-place sealers) and/or drying. Upon coating to the desired thickness, the coated substrate is cured either by heating/curing (e.g., to melt for the thermoplastic composition or to crosslink for the thermosetting compositions either by thermal or actinic radiation (e.g., UV radiation)).

Examples. The following examples are provided to illustrate the inventions and do not limit the scope of the invention.

Preparation of matting agents:

Example A: Aluminum trihydroxide (ATH) manufactured by Sibelco, under the tradename Portafill A40.

Example B: Barium sulfate ($BaSO_4$) manufactured by Cimbar Performance Mineral, under the trade name Cimbar XF.

Examples C and D:

Continuous Loop Reactor Set Up for the preparation of the matting agentsof Example C and Example D. The precipitation apparatus is configured in a recycle loop where the reaction slurry is circulated numerous times before it is discharged (FIG. 1). The loop is comprised of sections of fixed pipe joined together by sections of flexible hose. The internal diameter of the piping/hose is approximately 1″ with a volume of approximately 15 L. On one side of the loop a pump is placed to circulate the reaction mixture and on the opposite side a Silverson in-line mixer is installed to provide additional shear to the system and also as a convenient place to add the acid. In between the pumps, a static mixer heat exchanger is installed to provide a means to control the temperature during production of silica. The discharge pipe, located after the acid addition point, allowed the product to discharge as a function of the rates at which silicate and acid are added. The discharge pipe could also be fitted with a back pressure valve that enable the system operate at temperatures greater than 100° C. The product discharge pipe can be oriented to collect product into a tank for additional modification (ex. pH adjustment), or it can be discharged directly into a rotary or press type filter. Optionally, acid can also be added into product discharge line to avoid post synthetic pH adjustments when product is being prepared at pH's greater than 7.0.

In the case of this invention, the Silverson in-line mixer is modified to provide a high level of mixing without providing shear. This is accomplished by removing the stator screen from the Silverson mixer and operating the unit with only the backing plate and the normal mixer head to provide the silicas of Example D. Alternatively, the Silverson mixer is run with the standard rotor/square hole high shear stator to obtain a smaller particle size silicas of Example C. Particle size could be adjusted in either configuration by changing the Silverson output.

Initial Set-Up. Prior to the introduction of acid and silicate into the system, precipitated silica, sodium sulfate, sodium silicate and water are added and recirculated at 80 L/min. This step is performed to fill the recycle loop with the approximate contents and concentrations of a typical batch to minimize the purging time before the desired product could be collected. It is also done to avoid the possibility of forming gel in the reactor, although subsequent experimentation reveals that acid and silicate could be directly added to the loop filled with water without gelling or plugging the system.

Example C (matting agent of the invention): 1.5 kg of Zeodent® 103, 1.34 kg of sodium sulfate, 11.1 L of sodium silicate (3.32 MR, 19.5%) and 20 L of water are added to the recirculation loop and it is heated to 83° C. with recirculation at 80 L/min with the Silverson operating at 60 Hz (3485 RPM) with the normal rotor/stator configuration (square holed high shear stator). Sodium silicate (3.32 MR, 19.5%) and sulfuric acid (17.1%) are added simultaneously to the loop at a silicate rate of 1.7 L/min and an acid rate sufficient to maintain a pH of 7.5. If necessary, the acid rate is adjusted accordingly to maintain the pH. Acid and silicate are added under these conditions for 40 minutes to purge unwanted silica out of the system before the desired material was collected. After 40 minutes had passed, the collection vessel is emptied and its contents discarded. The silica product is then collected in a vessel with stirring at 40 RPM while maintaining the temperature at approximately 80° C. After the desired quantity of product is collected, addition of acid and silicate are stopped and the contents of the loop are allowed to circulate.

The silica product in the collection vessel is transferred to a batch reactor and is heated to 95° C. with stirring at 80 RPM and recirculation at 80 L/min. Sodium silicate (2.65 MR, 19.5%) is added to the reactor until a pH of 9.5 (+/−0.2) was reached. Once pH 9.5 (+/−0.2) is reached, sodium silicate (2.65 MR, 19.5%) and sulfuric acid (17.1%) are added at rates of 1.66 L/min and 0.80 L/min, respectively. If needed, the acid rate is adjusted to maintain pH 9.5 (+/−0.2). After a total time of 60 minutes, the flow of sodium silicate is stopped and the pH is adjusted to 7.0 with continued addition of sulfuric acid (19.5%) at 0.80 L/min. The batch is digested for 15 minutes at pH 7.0, and was then filtered and washed to a conductivity of <1500 μS. Prior to drying, the pH of the silica slurry is adjusted to 5.0 with sulfuric acid and is spray dried to a target moisture of 5.0%.

Example D (matting agent of the invention): 1.5 kg of Zeodent® 103, 1.34 kg of sodium sulfate, 11.1 L of sodium silicate (3.3 MR, 19.5%) and 20 L of water are added to the recirculation loop and it is heated to 90° C. with recirculation at 60 L/min with the Silverson operating at 30 Hz (1742 RPM) with the stator screen removed (we can reference the oral care patent). Sodium silicate (3.3 MR, 19.5%) and sulfuric acid (17.1%) are added simultaneously to the loop at a silicate rate of 1.7 L/min and an acid rate sufficient to maintain a pH of 7.5. If necessary, the acid rate is adjusted accordingly to maintain the pH. Acid and silicate are added under these conditions for 40 minutes to purge unwanted silica out of the system before the desired material is collected. After 40 minutes has passed, the collection vessel is emptied and its contents discarded. The silica product is then collected in a vessel with stirring at 40 RPM while maintaining the temperature at approximately 80° C. After the desired quantity of product is collected (700 L), addition of acid and silicate are stopped and the contents of the loop are allowed to circulate.

The silica product in the collection vessel is transferred to a batch reactor and is heated to 95° C. with stirring at 80 RPM. Sodium silicate (3.3 MR, 19.5%) is added to the reactor until a pH of 9.5 (+/−0.2) is reached. Once pH 9.5 (+/−0.2) is reached, sodium silicate (3.32 MR, 20.0%) and sulfuric acid (17.1%) are added at rates of 1.66 L/min and 0.80 L/min, respectively. If needed, the acid rate is adjusted to maintain pH 9.5 (+/−0.2). After a total time of 60 minutes, the flow of sodium silicate is stopped and the pH is adjusted to 7.0 with continued addition of sulfuric acid (17.1%) at 0.81 L/min. The batch is digested for 15 minutes at pH 7.0, and is then filtered and washed to a conductivity of <1500 µS. Prior to drying, the pH of the silica slurry is adjusted to 5.0 with sulfuric acid and is spray dried to a target moisture of 5.0%.

The characteristics of the particles of Examples A and B are provided by the manufacturer. Particle size of Example C and Example D are measured by submitting the dry particles to the instrument for analysis, and the samples are de-agglomerated using the instrument's internal ultrasonic vibration at setting 4 for 2 minutes. Precipitated silica particle size is then be measured using a HORIBA Laser Scattering Dry Particle Size Distribution Analyzer LA-950 through the angle of scattered laser light. $D_{50}$, referring to the particle size for which 50% of the sample has a smaller size and 50% of the sample has a larger size are provided. Oil absorption values are measured using the rub-out method (ASTM D 281). This method is based on a principle of mixing linseed oil with silica by rubbing the linseed oil/silica mixture with a spatula on a smooth surface until a stiff putty-like paste is formed. By measuring the quantity of oil required to have a paste mixture which will curl when spread out, the oil absorption value of the silica can be calculated, which represents the volume of oil required per unit weight of silica to saturate the silica sorptive capacity. A higher oil absorption level indicates a higher structure of silica. A low value is indicative of what is considered a low-structure silica. The oil absorption value can be determined from the following equation:

Oil absorption=(cc oil absorbed)/(wt. silica (g))× 100=(cc oil absorbed/100g silica).

Sphericity of Examples C and D are measured using Flowcam 8000 analyzer as disclosed herein. The results are provided in Table 1.

TABLE 1

| Example | A | B | C | D |
|---|---|---|---|---|
| Description | Portafill A40 (ATH) | Cimbar XF (BaSO₄) | Spherical Precip. Silica matting agent of the invention | Spherical Precip. Silica matting agent of the invention |
| BET SA (m²/g) | | | 4.5 | 5.3 |
| Oil absorption (g/100 g) | 20* | 11* | 36 | 30 |
| 5% pH | | 8.5* | 7.4 | 7.7 |
| Moisture (%) | | | 3.6 | 4.8 |
| Median Particle Size, d50 (µm) | 11.5* | 3.0* | 6.39 | 15.5 |
| d10 (µm) | | | 3.57 | 2.80 |
| d90 (µm) | | | 10.73 | 24.81 |
| (d90 − d10)/d50 | | | 1.12 | 1.14 |
| Sphericity | | | 0.92 | 0.93 |
| Sodium Sulfate (%) | | | 0.83 | 0.50 |
| Pour Density (g/l) | | 1201* | 531 | 529 |
| Pack Density (g/l) | | 1842* | 836 | 847 |

*Manufacturer provided values

Preparation of the powder coating compositions (Examples 1-8): Examples 2-8 are prepared by incorporating using a SpeedMixer® Aerosil R972, fumed silica, Aerosil R9200 fumed silica, VP RS 920 fumed silica, and spherical silica matting agents of the invention as described in Example C and Example D into commercial grade high gloss black TGIC polyester powder coating composition. Example 1 is a control wherein no additional matting agent is added. The compositions and process conditions are summarized in Table 2 below.

TABLE 2

| Base Material | PFB603S9 | | | | | | | |
|---|---|---|---|---|---|---|---|---|
| Description | Bike Black; high gloss black TGIC polyester powder coating | | | | | | | |
| Supplier | Axalta Powder Coatings | | | | | | | |
| | Example 1 | Example 2 | Example 3 | Example 4 | Example 5 | Example 6 | Example 7 | Example 8 |
| PFB603S9 Bike Black | 250 | 250 | 250 | 250 | 250 | 250 | 250 | 250 |
| Aerosil R972 (fumed Silica) | | 0.75 | | | | | | |
| Aerosil R9200 (fumed silica) | | | 0.75 | | | | | |
| VP RS 920 (fumed silica) | | | | 0.75 | | | | |
| Silicas of Example C | | | | | 2.5 | 12.5 | | |
| Silicas of Example D | | | | | | | 2.5 | 12.5 |
| Total | 250 | 250.75 | 250.75 | 250.75 | 252.5 | 262.5 | 252.5 | 262.5 |
| Concentration of Silica modification | Control | 0.3% | 0.3% | 0.3% | 1.0% | 5.0% | 1.0% | 5.0% |
| | | | | Process | | | | |
| Speedmixer time | N | 1 min | 1 min | 1 min | 40 sec | 40 sec | 40 sec | 40 sec |
| Speedmixer speed | N | 1500 | 1500 | 1500 | 1000 | 1000 | 1000 | 1000 |
| Ceramic cylinders | N | Y | N | Y | N | N | N | N |

17

The resulting mixtures of Examples 1-8 are applied to metal panels via typical electrostatic powder coating application process and cured in an oven at 400° F. The resulting coated substrates of Examples 1-8 are evaluated for gloss at 20° and 60°. FIG. 2 shows the strongest matting effect at 5% matting agents of the invention loading level (Example 8). Pencil scratch hardness test of Examples 1 and 8 are also carried out in accordance with the American Society for Testing and Materials ASTM D3363 and the results are shown in Table 3 below. It can be seen that the addition of 5% spherical precipitated silica matting agent of Example D shows an improvement in pencil hardness (ASTM D3363) by one lead hardness.

TABLE 3

|  | Pencil hardness |
| --- | --- |
| Sample 1 | HB |
| Sample 8 | F |

Based on the results of Examples 1-8 above, an experimental design is developed (Examples 9-1 to 9-16) and testing is conducted to look at the smallest and largest matting agents of the invention, i.e., Example C and Example D, respectively, and compare this to barium sulfate and aluminum trihydrate, two inert fillers that are typically used for matting powder coatings. The spherical, precipitated silica of the invention and other silica and inert filler are added along with other ingredients into the raw material mix. This is pre-mixed to obtain uniformity prior to being added into an APV 19 mm twin screw extruder. The premix is then added via a feeding funnel and the screws move the ingredients through the different zones in the extruder. The resulting shear forces cause the resin to melt and disperse the pigments, additives, and inert fillers into an uniform mixture. The extrudate is pushed out through a die and squeezed in the form of a flat sheet by chilled colander rolls. The flat sheet is then cooled on a cooling belt and broken up into chips. The chips are post blended with a free flow additive (AEROXIDE® Alu C) and put through a Strand benchtop mill to grind the chips into powder which is then classified through a 140 mesh (105 μm) screen. The powder is checked by being pressed into a 1.0 gram pellet and melted at 400° F. on an angled panel to determine its melt flow. The virgin powder coating is then sprayed through an electrostatic powder gun that charges the powder and transfers it to the grounded steel panels. The panels are heated for 15 minutes at 400° F. in an oven, melting the powder and crosslinking (curing) the resin to form the final coating. The coating is then evaluated for gloss, adhesion, flexibility and hardness. The experimental design is summarized in Table 4 and the results of gloss and pill flow tests are shown in Table 5.

TABLE 4

Experimental design for comparing matting effect to inert fillers
Powder Coating Trials; SD Polyester

|  | 9-1 | 9-2 | 9-3 | 9-4 | 9-5 | 9-6 | 9-7 | 9-8 | 9-9 | 9-10 | 9-11 | 9-12 | 9-13 | 9-14 | 9-15 | 9-16 |
| --- | --- | --- | --- | --- | --- | --- | --- | --- | --- | --- | --- | --- | --- | --- | --- | --- |
| Crylcoat 4659-0 Resin | 463.1 | 458.4 | 448.9 | 439.4 | 368.1 | 439.4 | 368.1 | 368.1 | 368.1 | 368.1 | 368.1 | 368.1 | 415.6 | 391.9 | 415.6 | 391.9 |
| Primid XL 552 Crosslinker | 24.4 | 24.1 | 23.6 | 23.1 | 19.4 | 23.1 | 19.4 | 19.4 | 19.4 | 19.4 | 19.4 | 19.4 | 21.9 | 20.6 | 21.9 | 20.6 |
| Resiflow P-67 Flow aid | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Benzoin Degassing | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Black Pearls 800 Carbon black | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| VP RS 920 Fumed silica |  | 5.0 | 15.0 |  |  |  |  |  |  |  |  |  |  |  |  |  |
| Precip. Silicas of Example C |  |  |  | 25.0 | 100.0 |  |  | 50.0 |  |  |  |  | 50.0 | 75.0 |  |  |
| Precip. Silicas of Example D |  |  |  |  |  | 25.0 | 100.0 | 50.0 |  | 25.0 |  | 25.0 |  |  | 50.0 | 75.0 |
| Cimbar XF Barium sulfate |  |  |  |  |  |  |  |  | 100.0 | 75.0 |  |  |  |  |  |  |
| Portafill A40 Aluminum trihydrate |  |  |  |  |  |  |  |  |  |  | 100.0 | 75.0 |  |  |  |  |
| Modification | 500 Control | 500 1% | 500 3% | 500 5% | 500 20% | 500 5% | 500 20% | 500 10 + 10% | 500 20% | 500 5 + 15% | 500 20% | 500 5 + 15% | 500 10% | 500 15% | 500 10% | 500 15% |
| Aeroxide Alu C Post blend | 0.3% to total chips after extrusion, before grind |  |  |  |  |  |  |  |  |  |  |  |  |  |  |  |

TABLE 4-continued

Experimental design for comparing matting effect to inert fillers
Powder Coating Trials; SD Polyester

| | 9-1 | 9-2 | 9-3 | 9-4 | 9-5 | 9-6 | 9-7 | 9-8 | 9-9 | 9-10 | 9-11 | 9-12 | 9-13 | 9-14 | 9-15 | 9-16 |
|---|---|---|---|---|---|---|---|---|---|---|---|---|---|---|---|---|
| APV 19 mm Twin Screw Extruder Strand Benchtop Mill | | | | | | | | | 500 RPM | | | | | | | |
| [mesh] screen | | | | | | | | | 140 | | | | | | | |
| Powder cure min/° F. | | | | | | | | | 15/400 | | | | | | | |

TABLE 5

Gloss and pill flow results

| Example No. | Powder Properties Testing Modification | Gloss 20° | 60° | 85° | Pill flow [mm] 1.00 g @ 400 F. |
|---|---|---|---|---|---|
| 9-1 | Control | 87 | 98 | 103 | 75 |
| 9-2 | 1% VP RS 920 | 88 | 98 | 104 | 69 |
| 9-3 | 3% VP RS 920 | 83 | 97 | 101 | 53 |
| 9-4 | 5% silicas of Example C | 52 | 85 | 100 | 69 |
| 9-13 | 10% silicas of Example C | 29 | 72 | 92 | 63 |
| 9-14 | 15% silicas of Example C | 16 | 60 | 89 | 60 |
| 9-5 | 20% silicas of Example C | 11 | 52 | 86 | 54 |
| 9-6 | 5% silicas of Example D | 48 | 82 | 94 | 70 |
| 9-15 | 10% silicas of Example D | 27 | 68 | 84 | 61 |
| 9-16 | 15% silicas of Example D | 15 | 55 | 75 | 64 |
| 9-7 | 20% silicas of Example D | 8 | 45 | 68 | 56 |
| 9-8 | 10% silicas of Example C/ 10% silicas of Example D | 10 | 49 | 77 | 57 |
| 9-9 | 20% Cimbar XF | 47 | 83 | 99 | 69 |
| 9-10 | 5% silicas of Example D/ 15% Cimbar XF | 30 | 72 | 93 | 64 |
| 9-11 | 20% Portafill A40 | 20 | 62 | 84 | 66 |
| 9-12 | 5% silicas of Example D/ 15% Portafill A40 | 17 | 59 | 81 | 62 |

Figure 3:
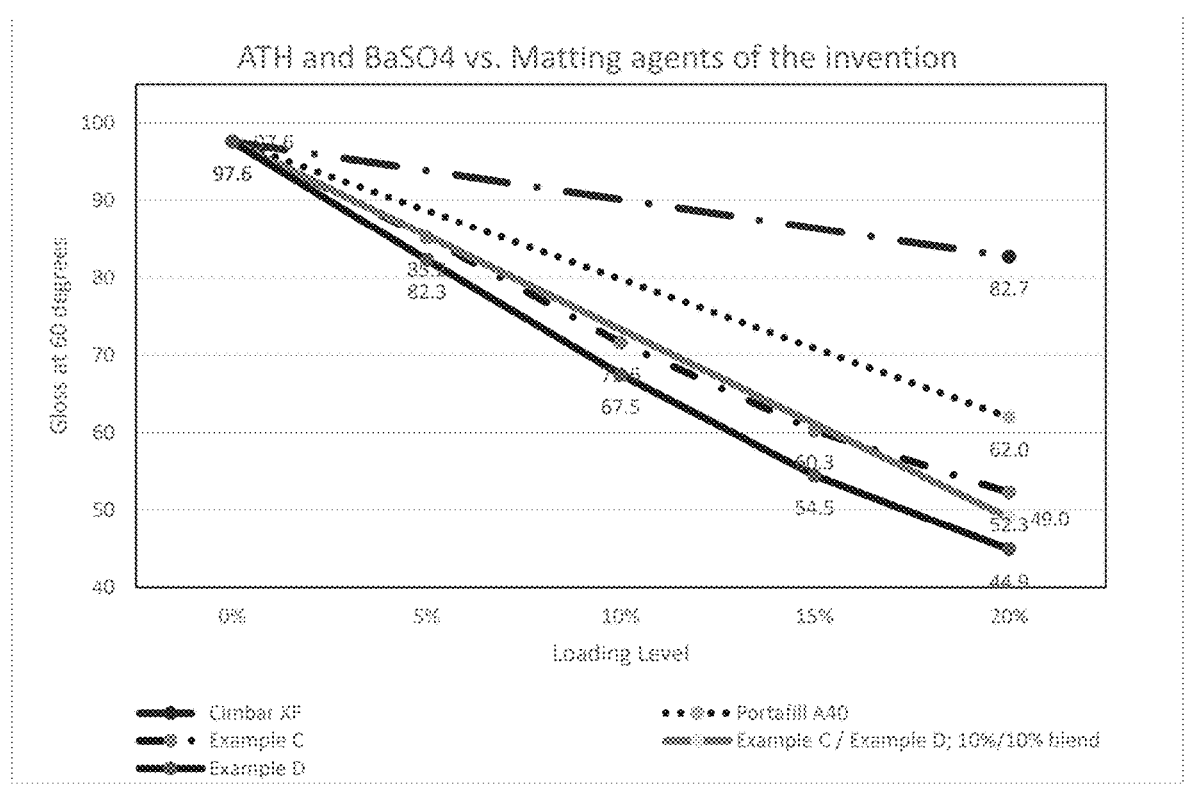
FIG. 3 shows matting results of the powder coatings of Examples 9 versus aluminum trihydrate and barium sulfate at various loading levels.
Figure 4:
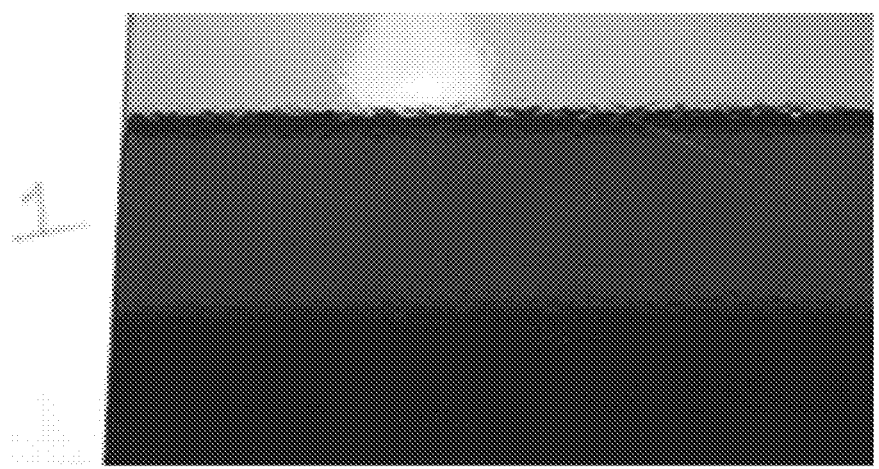
FIG. 4 shows an image of the substrate with cured powder coating composition of Example 9-1.
Figure 5:
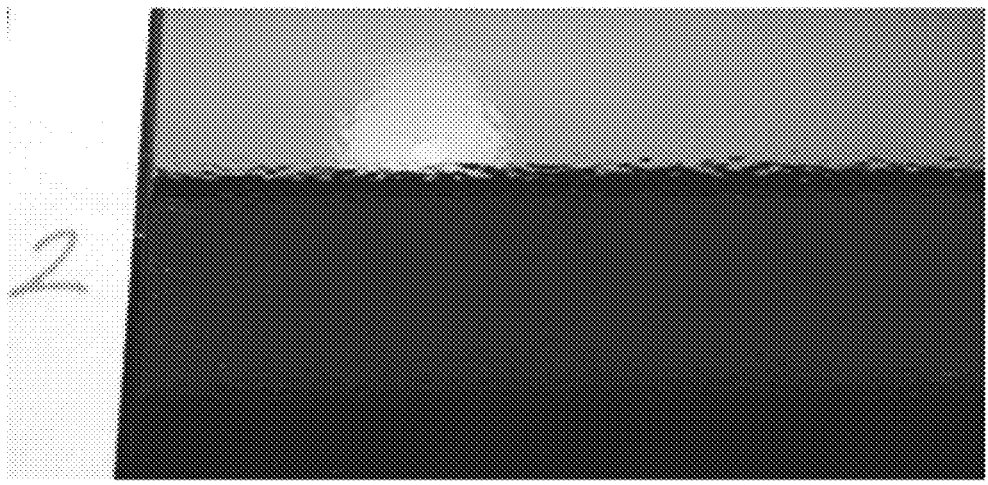
FIG. 5 shows an image of the substrate with cured powder coating composition of Example 9-2.
Figure 6:
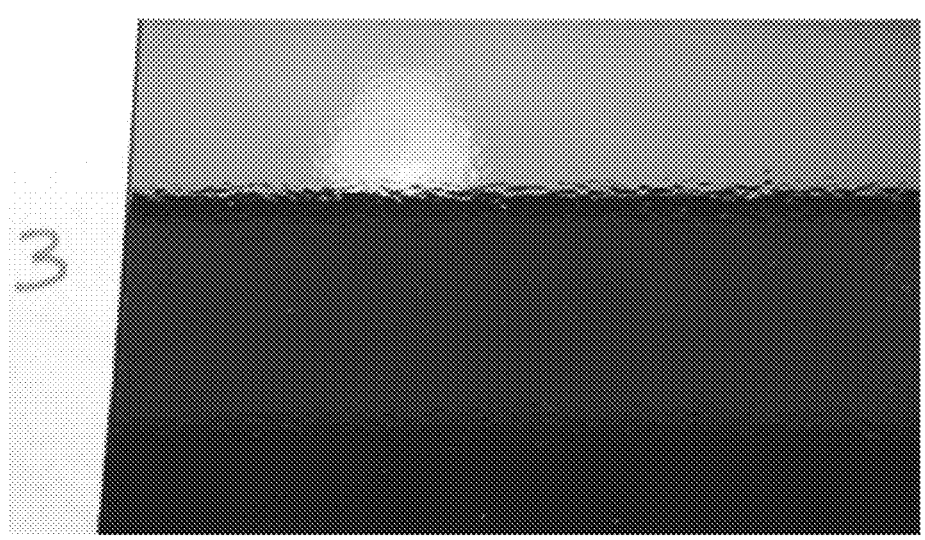
FIG. 6 shows an image of the substrate with cured powder coating composition of Example 9-3.
Figure 7:
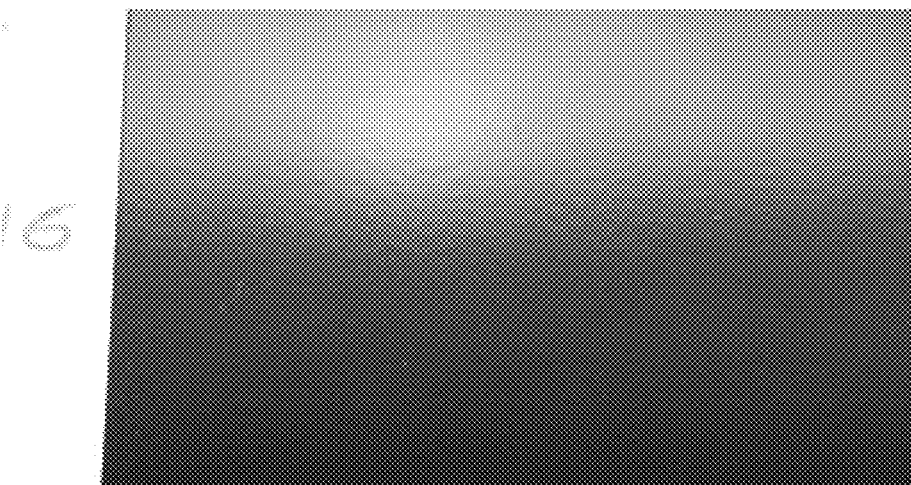
FIG. 7 shows an image of the substrate with cured powder coating composition of Example 9-16.
Figure 8:
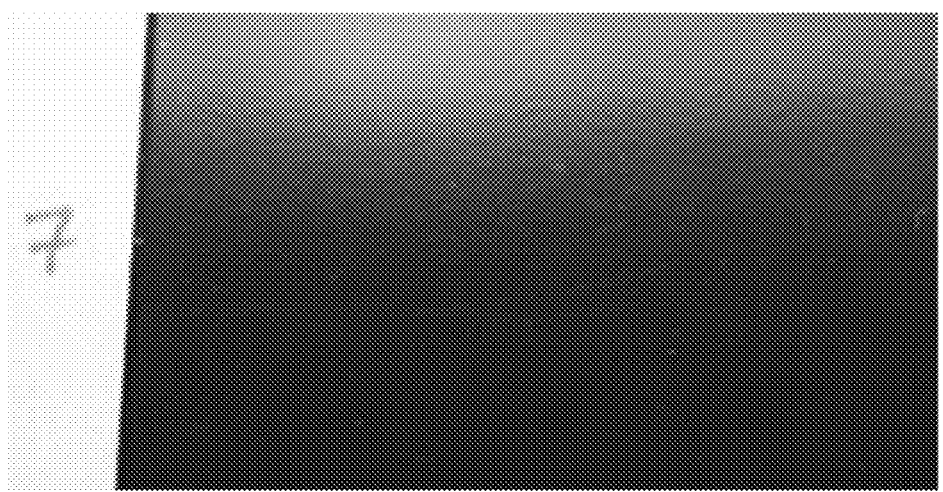
FIG. 8 shows an image of the substrate with cured powder coating composition of Example 9-7.
Figure 9:
FIG. 9 shows an image of the substrate with cured powder coating composition of Example 9-5.
Figure 10:
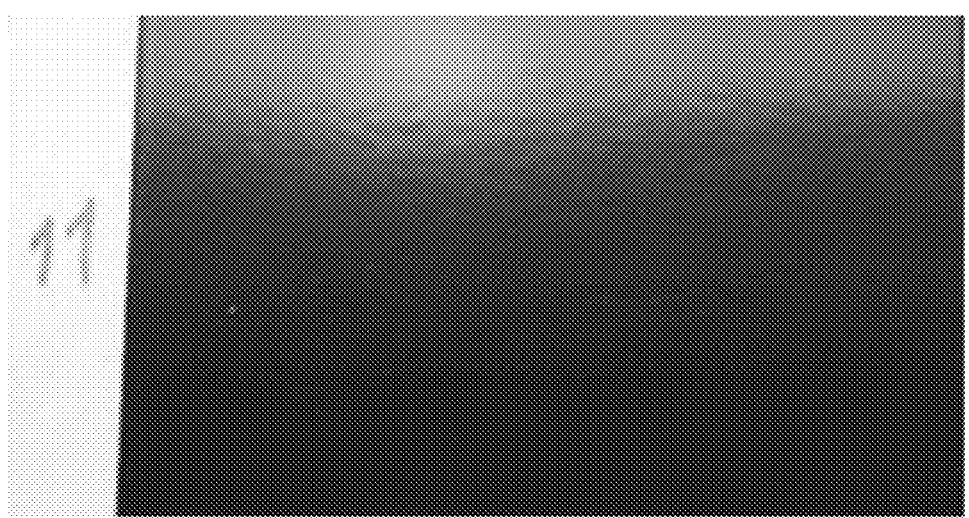
FIG. 10 shows an image of the substrate with cured powder coating composition of Example 9-11.
Figure 11:
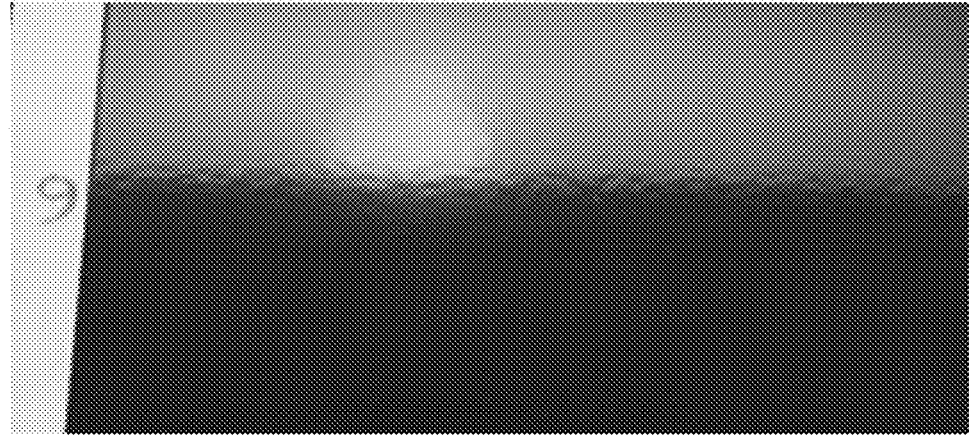
FIG. 11 shows an image of the substrate with cured powder coating composition of Example 9-9.
Figure 12:
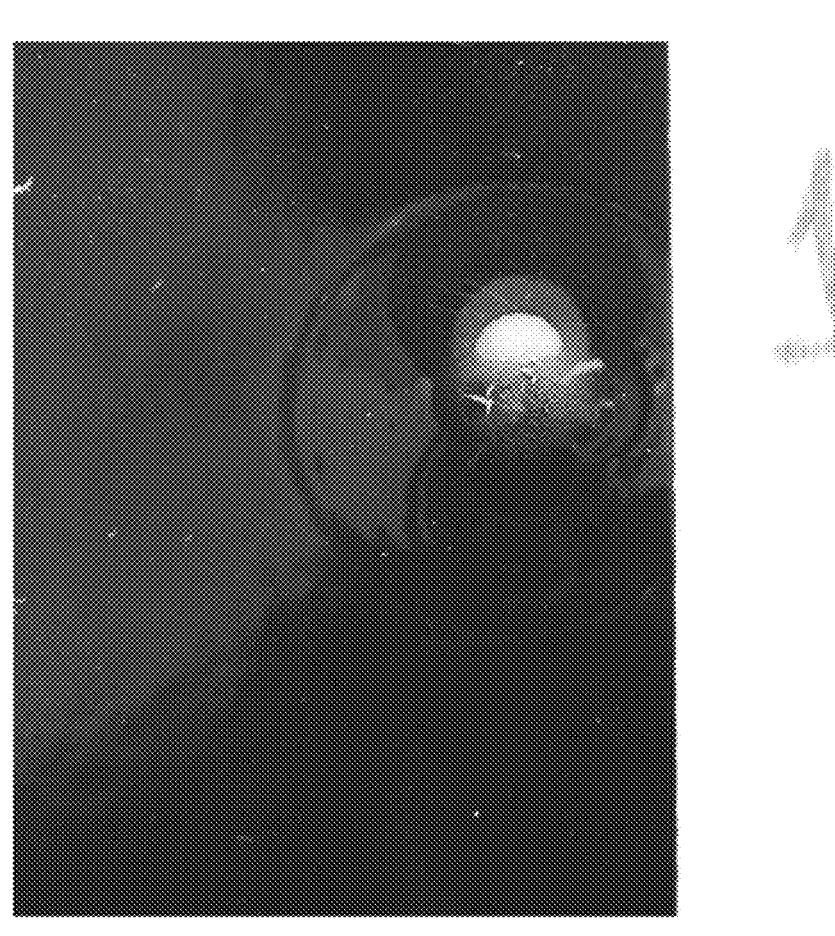
FIG. 12 shows an image of the result of the impact test for Example 9-1.
Figure 12:
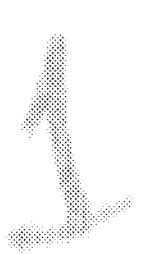
Figure 13:
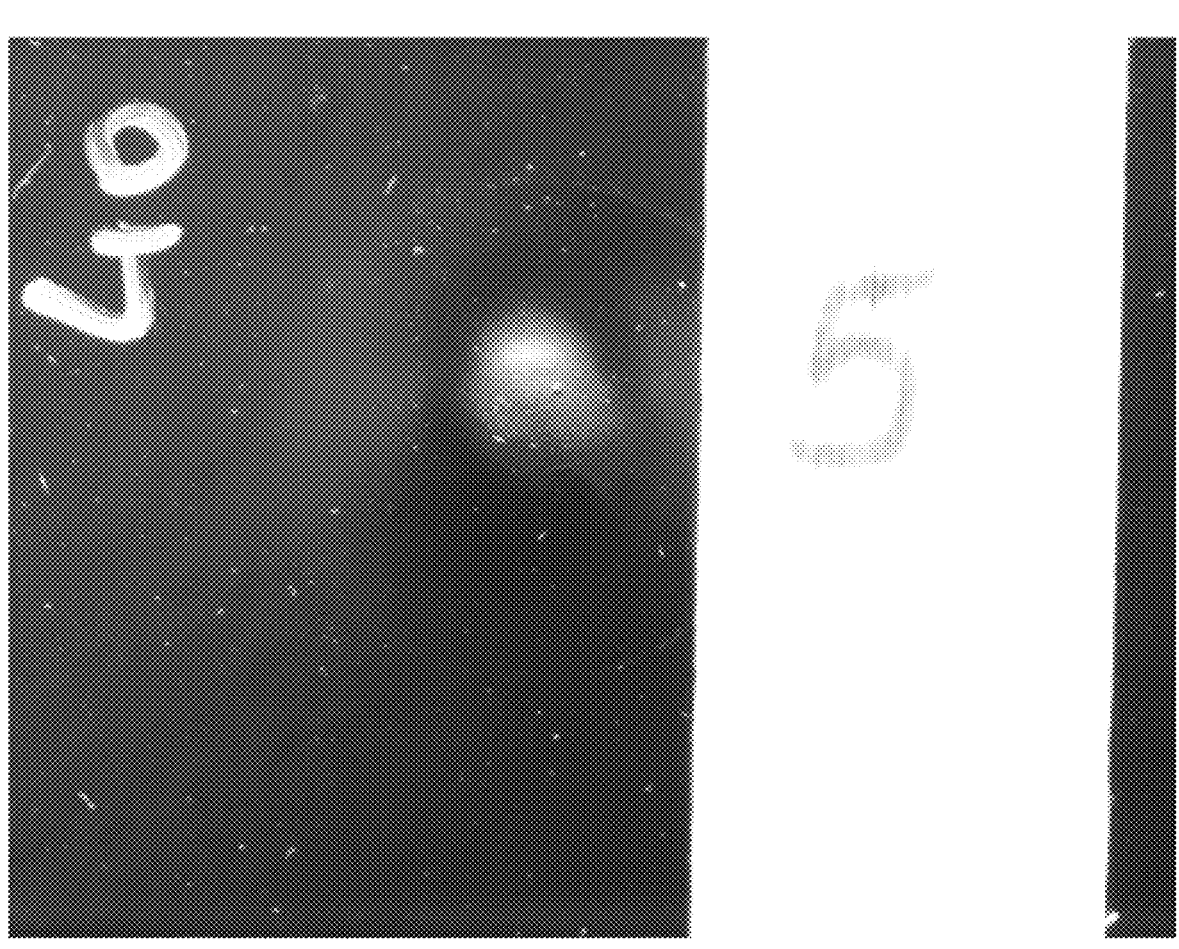
FIG. 13 shows an image of the result of the impact test for Example 9-5.
Figure 14:
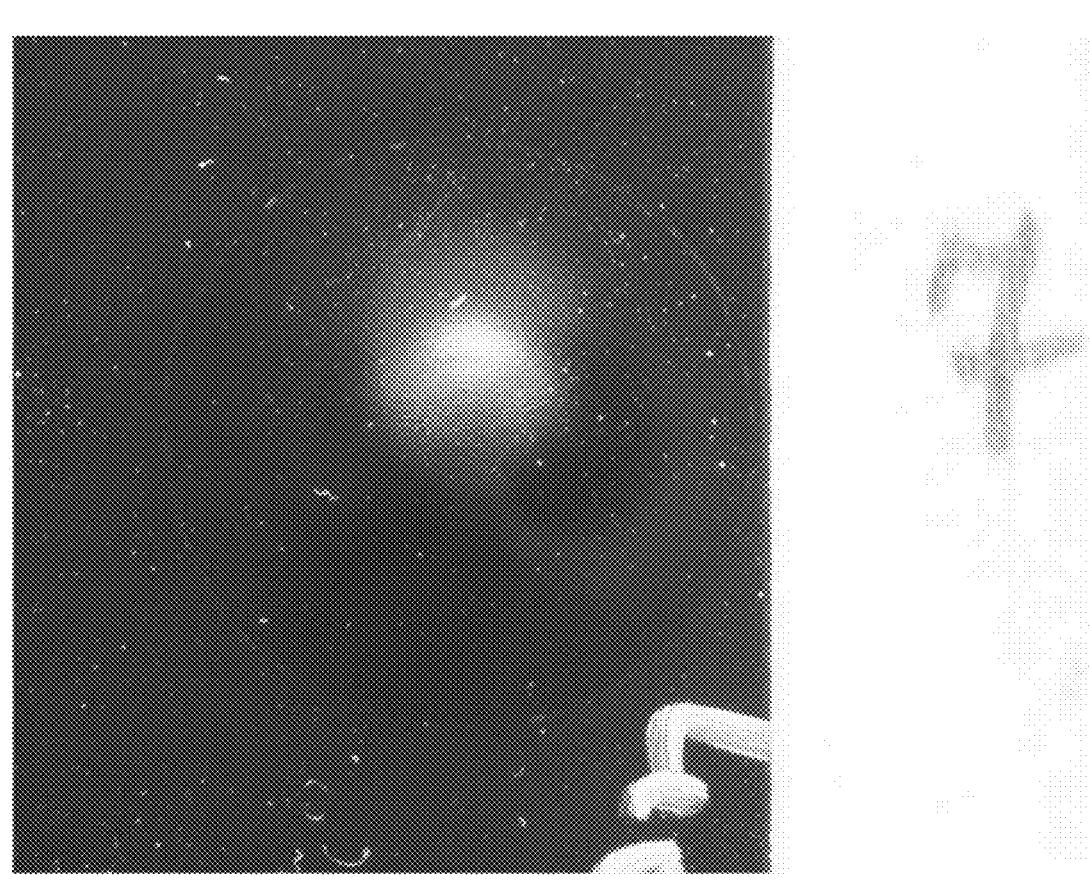
FIG. 14 shows an image of the result of the impact test for Example 9-7.
Figure 15:
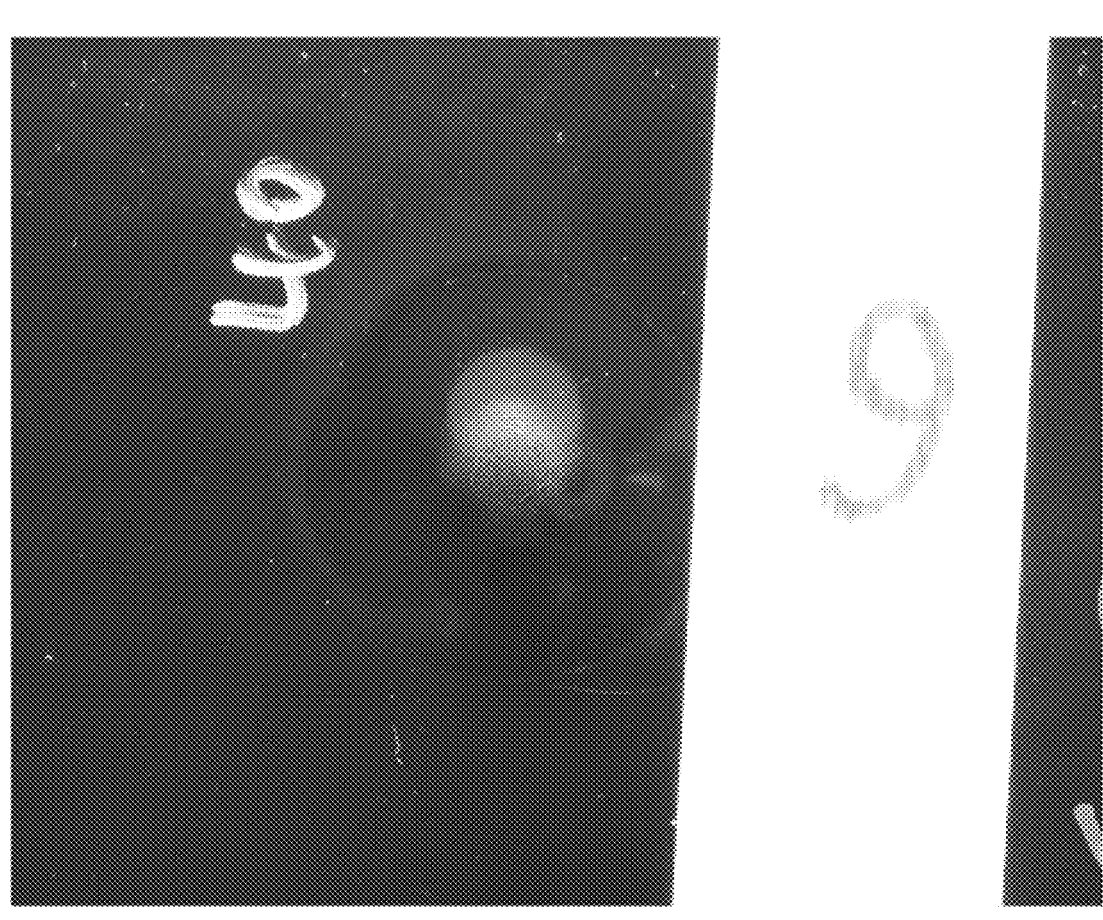
FIG. 15 shows an image of the result of the impact test for Example 9-9.
Figure 16:
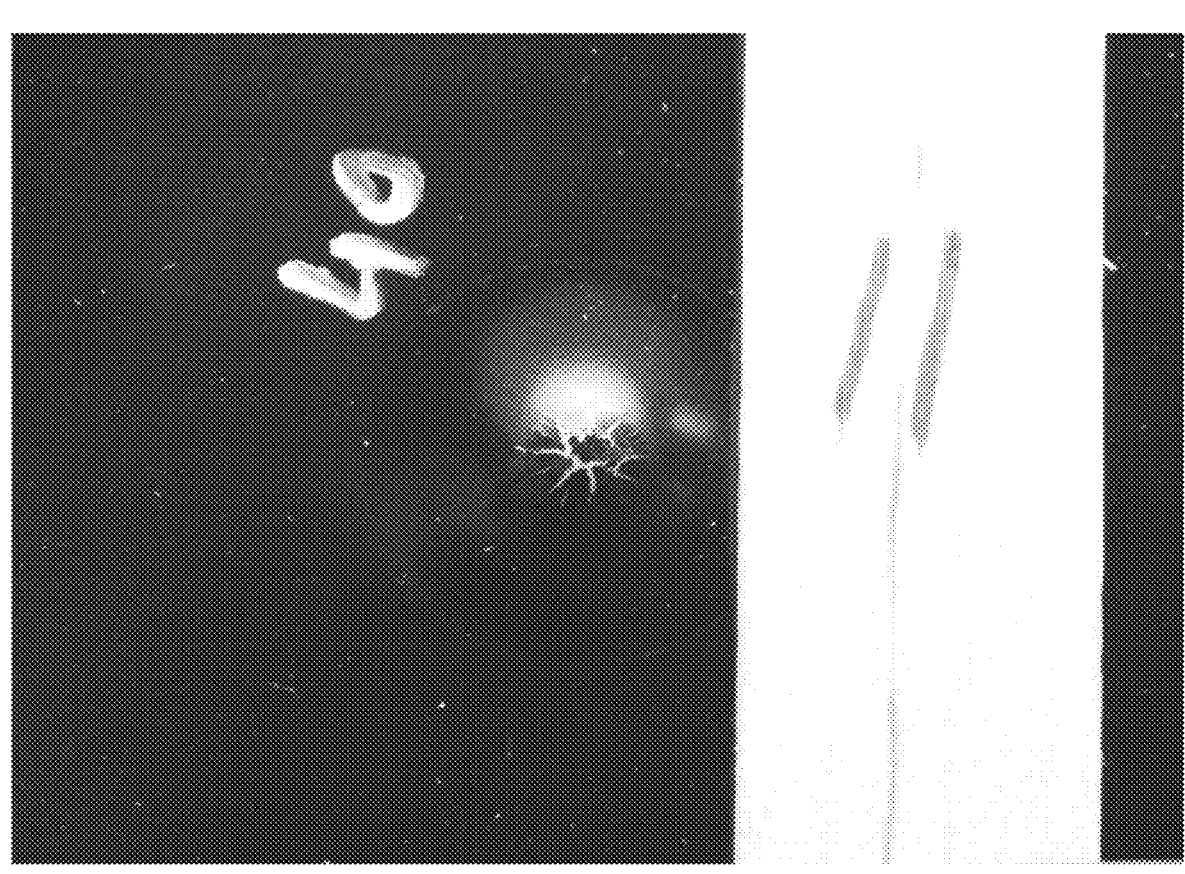
FIG. 16 shows an image of the result of the impact test for Example 9-11.
Figure 17:
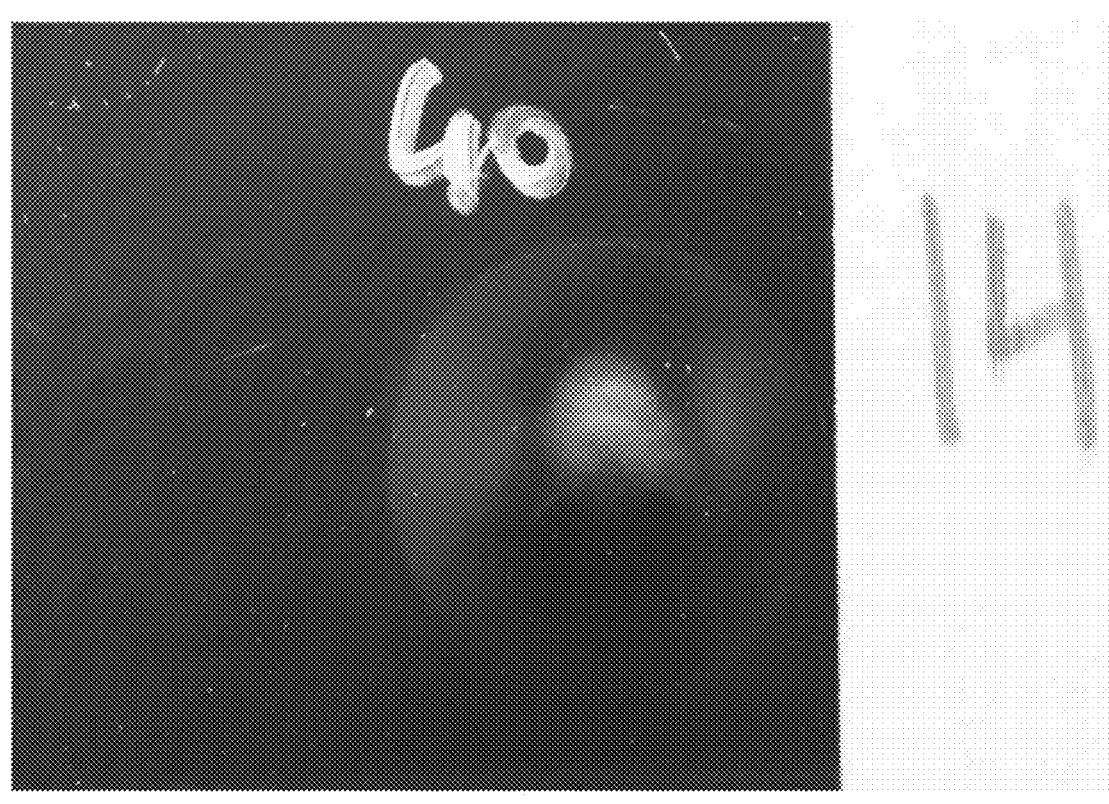
FIG. 17 shows an image of the result of the impact test for Example 9-14.
Figure 18:
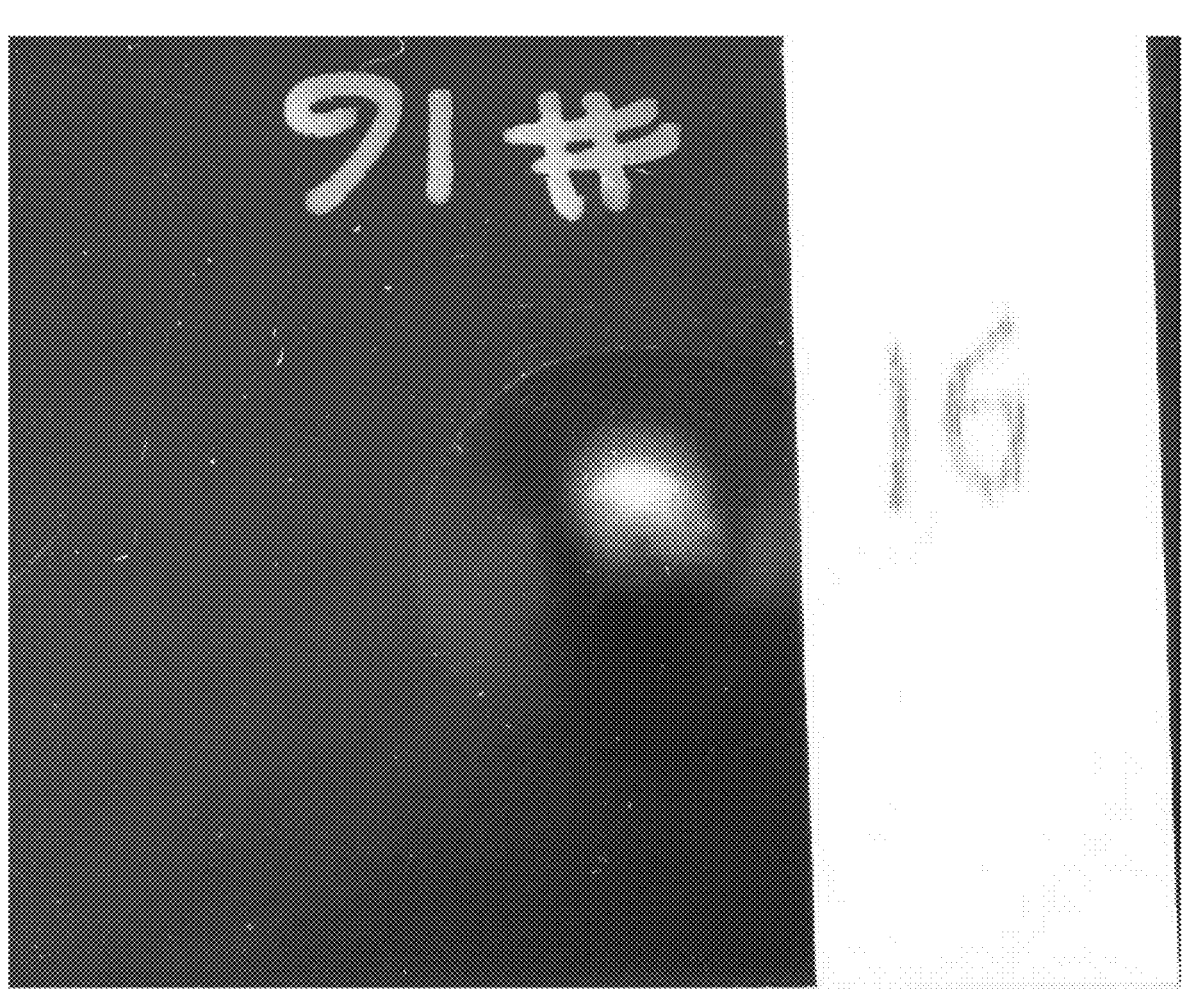
FIG. 18 shows an image of the result of the impact test for Example 9-16.

The gloss is measured using a BYK Gloss Meter at 20°, 60° and 85°. The results of Table 6 show that matting is more efficient, at the same use levels, using the spherical precipitated silica matting agents of the invention than the comparable typical matting inert fillers $BaSO_4$ and ATH. The matting efficiency is also linear and predictable (see FIG. 3—matting results of various powder coatings of Example 9 versus Aluminum trihydrate and barium sulfate). The appearance is very uniform without excessive orange peel, comparable to the ATH (see FIGS. 4-11). This would not have been predicted based on the pill flow test indicating a higher melt viscosity which would typically result in more orange peel.

The powder coating compositions of Examples 1, 5, 7 and 11 are subjected to the cross-hatch adhesion and the conical Mandrel bend tests. Crosshatch adhesion test is performed according to American Society for Testing and Materials ASTM D 3359 standard test method wherein spacing used is 2 mm grid. Elcometer 1510 Conical Mandrel Bend Tester is carried out as follows: the frame has a bending lever with a roller which pivots on a steel conical mandrel with a diameter from 3.2-38.1 mm (0.12-1.5"). A graduation indicates the mandrel diameter in both mm and inches. The specimen is bent on part of, or along, the entire length of the mandrel, and the results (cracks) corresponding to different test diameters can be observed in a single operation. Table 6 shows that both the cross-hatch adhesion and Mandrel bend passed with the spherical precipitated matting agent particles of the invention at 20% loading, whereas the ATH failed in flexibility (see Table 6).

TABLE 6

Adhesion and flexibility results

| Sample No. | Modification | # Adhesion | ¼" Mandrel |
|---|---|---|---|
| 9-1 | Control | 5B | Pass |
| 9-5 | 20% Example C | 5B | Pass |
| 9-7 | 20% Example D | 5B | Pass |
| 9-11 | 20% Portafill A40 | 5B | Fail |

In liquid coatings, the spherical precipitated silica particles can affect the adhesion of the coating since its higher density can potential cause it to sink to the substrate surface, interfering with the adhesion of the resin to the substrate. In powder coatings, the spherical precipitated silica particles of the invention are encased in resin and due to the short timeframe for the melt-cure cycle, the spherical precipitated silica particles of the invention remain in the coating layer and do not have a chance to migrate to the substrate surface, allowing for good adhesion. In addition, slow deformation flexibility improves due to the low oil adsorption of the particles as demonstrated by passing Mandrel bend and higher values in the Erichsen cupping test. Reinforcement is also shown on rapid deformation tests as shown with the reverse impact test in accordance with the American Society for Testing and Materials ASTM D 2794 where a weight is dropped on a ball shaped indenter from the back of the panel and the coating is inspected for cracking due to the impact (see Table 7 and FIGS. 12-18).

TABLE 7

Mandrel bend, reverse impact, and Erichsen cupping results

| Example No. | Mechanical Property Testing Modification | Conical Mandrel | Impact test 40 inlb (reverse) @ 3.0 mils | Erichsen Cupping 6 mm/s failure at [mm] |
|---|---|---|---|---|
| 9-1 | Control | Pass | some cracking | 2.0 |
| 9-2 | 1% VP RS 920 | Pass | severe cracking | 1.1 |
| 9-3 | 3% VP RS 920 | Pass | some cracking | 1.1 |

TABLE 7-continued

| Mandrel bend, reverse impact, and Erichsen cupping results | | | | |
| --- | --- | --- | --- | --- |
| Mechanical Property Testing | | | Impact test 40 inlb | Erichsen Cupping 6 mm/s |
| Example No. | Modification | Conical Mandrel | (reverse) @ 3.0 mils | failure at [mm] |
| 9-4 | 5% silicas of Example C | Pass | some cracking | 4.4 |
| 9-13 | 10% silicas of Example C | Pass | no cracking | 8.6 |
| 9-14 | 15% silicas of Example C | Pass | no cracking | 7.8 |
| 9-5 | 20% silicas of Example C | Pass | minor cracking | 4.0 |
| 9-6 | 5% silicas of Example D | Pass | minor cracking | 5.6 |
| 9-15 | 10% silicas of Example D | Pass | no cracking | 6.9 |
| 9-16 | 15% silicas of Example D | Pass | no cracking | 9.7 |
| 9-7 | 20% silicas of Example D | Pass | minor cracking | 8.9 |
| 9-8 | 10% silicas of Example C/10% silicas of Example D | Pass | minor cracking | 4.2 |
| 9-9 | 20% Cimbar XF | Pass | some cracking | 1.5 |
| 9-10 | 5% silicas of Example D/15% Cimbar XF | Pass | some cracking | 2.1 |
| 9-11 | 20% Portafill A40 | Fail | severe cracking | 1.4 |
| 9-12 | 5% silicas of Example D/15% Portafill A40 | Fail | severe cracking | 1.9 |

Impact test rating scale: no > minor > some > severe

The spherical precipitated silica matting agents of the invention also improve hardness of the powder coatings. This is demonstrated by improvement in the pencil scratch hardness (test according to ASTM D 3363) and Erichsen Hardness, as shown in Table 8. Pencil scratch hardness is shown by how hard the pencil lead is to damage the coating. Pencil hardness scales are from 10B begin the softest to F in the middle then harder to H, 2H, etc. ending at 10H being the hardest. Erichsen hardness evaluates the highest force for which the surface doesn't show any indentation. For the measurement of the hardness, the red spring is used (measurement range of 0-10N+0,5N).

TABLE 8

| Pencil hardness and Erichsen hardness | | | |
| --- | --- | --- | --- |
| Sample No. | Hardness Testing Modification | Mitsubishi Pencil Set Pass Rating | Erichsen Hardness Test (Model 318) Pass rating [N] |
| 9-1 | Control | H | 2 |
| 9-2 | 1% VP RS 920 | H | 1.75 |
| 9-3 | 3% VP RS 920 | H | 1.75 |
| 9-4 | 5% silicas of Example C | H | 1.75 |
| 9-13 | 10% silicas of Example C | 2H | 3.5 |
| 14 | 15% silicas of Example C | 3H | 3.25 |
| 9-5 | 20% silicas of Example C | 3H | 2 |
| 9-6 | 5% silicas of Example D | 2H | 2.25 |
| 9-15 | 10% silicas of Example D | 3H | 3.5 |
| 9-16 | 15% silicas of Example D | 4H | 3 |
| 9-7 | 20% silicas of Example D | 5H | 3 |
| 9-8 | 10% silicas of Example C/ 10% silicas of Example D | 4H | 2.5 |
| 9-9 | 20% Cimbar XF | H | 2 |
| 9-10 | 5% silicas of Example D/ 15% Cimbar XF | 3H | 3 |

TABLE 8-continued

| Pencil hardness and Erichsen hardness | | | |
| --- | --- | --- | --- |
| Sample No. | Hardness Testing Modification | Mitsubishi Pencil Set Pass Rating | Erichsen Hardness Test (Model 318) Pass rating [N] |
| 9-11 | 20% Portafill A40 | 3H | 2 |
| 9-12 | 5% silicas of Example D/ 15% Portafill A40 | 3H | 2.5 |

The results above show that the matting agents of the invention's unique morphology can provide excellent matting that surpasses other filler particles used in the market while providing comparable appearance, improving hardness while maintaining adhesion, and improving flexibility. This is a unique particle that is providing unique combination of performance characteristics for powder coating.

Notwithstanding that the numerical ranges and parameters setting forth the broad scope of the invention are approximations, the numerical values set forth in the specific examples are reported as precisely as possible. Other than in the operating examples, or where otherwise indicated, all numbers expressing quantities of ingredients, reaction conditions, and so forth used in the specification are to be understood as being modified in all instances by the term "about." Any numerical value, however, inherently contains errors necessarily resulting from the standard deviation found in their respective testing measurements.

The invention claimed is:

1. A matte powder coating composition, comprising:
   (a) one or more resin; and
   (b) spherical precipitated silicas having a Brunauer, Emmett, and Teller (B.E.T.) surface area in a range of 4.5 to 15 m²/g, an oil absorption of less than 40 g/100 g, and a median particle size (d50) in a range of 1 to 20 μm.

2. The composition of claim 1, wherein the spherical precipitated silicas are present in an amount from 1 to 40 wt. %, based on a total weight of the composition.

3. The composition of claim 1, wherein the spherical precipitated silicas have a median particle size (d50) in a range of 1 to 10 μm.

4. The composition of claim 1, wherein the spherical precipitated silicas have
   a (d90-d10)/d50 ratio of 1.1 to 2, and/or
   a sphericity $S_{80}$ value of >0.85.

5. The composition of claim 1, wherein the one or more resin is a thermosetting resin, and said composition further comprises a curing agent.

6. The composition of claim 1, wherein the one or more resin is an epoxy, polyester, or acrylic, silicone, fluoroethylene vinyl ether (FEVE) fluoropolymer resin, or a mixture thereof.

7. The composition of claim 5, wherein the curing agent is an amine, acid, anhydride, of blocked isocyanate curing agent, or epoxy terminated, hydroxyl terminated, oxirane terminated or hydroxyalkylamide curing agent.

8. The composition of claim 1, wherein the one or more resin is a thermoplastic resin.

9. The composition of claim 1, wherein the one or more resin is a UV curable resin, and the composition further comprises a photoinitiator.

10. The composition of claim 1, further comprising one or more pigments, fillers, extenders, flow additives, flow aids, catalysts, degassing agents, other matting agents, gloss modifiers, or waxes.

11. A matting agent for a powder coating composition, comprising:

spherical precipitated silicas having a B.E.T. surface area of 4.5 to 15 m$^2$/g, an oil absorption of less than 40 g/100 g, and a median particle size (d50) of 1 to 20 μm.

12. The matting agent of claim 11, wherein the spherical precipitated silicas are present in an amount from 1 to 40 wt. %, based on a total weight of the powder coating composition.

13. The matting agent of claim 11, wherein the spherical precipitated silicas have a median particle size (d50) is in a range of 1 to 10 μm.

14. The matting agent of claim 11, wherein the spherical precipitated silicas have a (d90-d10)/d50 ratio in a range of 1.1 to 2.

15. The matting agent of claim 11, wherein the spherical precipitated silicas have a sphericity $S_{80}$ value of >0.85.

16. A method for reducing gloss in a powder coating composition, comprises the method comprising:

adding an effective amount of the matting agent according to claim 11, to the powder coating composition.

17. The method of claim 16, wherein the matting agent is present in an amount from 1 to 40 wt. %, based on a total weight of the powder coating composition.

18. The method of claim 16, wherein said powder coating composition comprises one or more resins, and wherein said powder coating composition optionally comprises a curing agent, photoinitiator, pigment, filler, extender, flow additive, flow aid, catalyst, degassing agent, other matting agent, gloss modifier, or wax.

19. The method of claim 16, further comprising:

adding one or more waxes.

20. The matting agent of claim 13, wherein the spherical precipitated silicas have one or more of the following characteristics:

the B.E.T. surface area is in a range of 5 to 15 m$^2$/g;

the oil absorption is of 30 to 40 g/100 g silicas; and/or the median particle size (d50) is in a range of 1 to 5 μm.

21. The composition of claim 1, wherein the one or more resin comprises a carboxy-functional polyester resin, wherein the spherical precipitated silicas are present in an amount from 1 to 20 wt. %, based on the total weight of the composition, wherein the oil absorption is 30 to less than 40 g/100g silicas; and wherein said composition further comprises a curing agent.

\* \* \* \* \*